US008201136B2

(12) United States Patent
Kumagai

(10) Patent No.: US 8,201,136 B2
(45) **Date of Patent: *Jun. 12, 2012**

(54) CAD APPARATUS, METHOD, AND COMPUTER PRODUCT FOR DESIGNING PRINTED CIRCUIT BOARD

(75) Inventor: Yoshitomo Kumagai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 387 days.

This patent is subject to a terminal disclaimer.

(21) Appl. No.: 11/905,108

(22) Filed: Sep. 27, 2007

(65) Prior Publication Data

US 2008/0141205 A1 Jun. 12, 2008

(30) Foreign Application Priority Data

Dec. 7, 2006 (JP) ................................ 2006-330501

(51) Int. Cl.
*G06F 17/50* (2006.01)

(52) U.S. Cl. ......................... 716/139; 716/102; 716/137

(58) Field of Classification Search .................... 716/11, 716/15, 137, 139, 100–102

See application file for complete search history.

(56) References Cited

U.S. PATENT DOCUMENTS 5,164,908 A 11/1992 Igarashi
5,568,397 A 10/1996 Yamashita et al.
5,987,458 A 11/1999 Anderson et al.
6,643,826 B2 11/2003 Abe
6,708,144 B1 3/2004 Merryman et al.
6,868,531 B1 3/2005 Hovanetz
7,039,892 B2 5/2006 Mantey et al.
7,168,041 B1 1/2007 Durrill et al.
7,302,666 B2 * 11/2007 Furukawa ....................... 716/13
7,444,612 B2 * 10/2008 Ariyama et al. ................ 716/15
7,546,571 B2 * 6/2009 Mankin et al. .................. 716/15
7,562,331 B2 * 7/2009 Gupta et al. .................... 716/15
2002/0018583 A1 2/2002 Gont et al.
2004/0098683 A1 5/2004 Maruyama et al.
2005/0080502 A1 4/2005 Chernyak et al.
2005/0278665 A1 * 12/2005 Gentry et al. ..................... 716/4
2008/0140323 A1 6/2008 Kumagai
2008/0141205 A1 6/2008 Kumagai
2008/0244498 A1 * 10/2008 Gupta et al. .................... 716/15

FOREIGN PATENT DOCUMENTS

CN 1521830 8/2004

(Continued)

OTHER PUBLICATIONS

Korean Office Action issued Aug. 25, 2009 in related Korean Patent Application 10-2007-0104506.

(Continued)

*Primary Examiner* — Stacy Whitmore
(74) *Attorney, Agent, or Firm* — Staas & Halsey LLP

(57) ABSTRACT

In a computer aided design (CAD) apparatus, an association-data acquiring unit acquires association data that defines an association between pins of a first connector and those of a second connector to be connected to the first connector, and an assignment of signals to the pins. A part-information acquiring unit acquires information including a symbol of the first connector. A layout-condition acquiring unit acquires a layout condition to lay out the symbol of the first connector on a circuit diagram. A circuit diagram creating/updating unit lays out the symbol of the first connector on the circuit diagram based on the layout condition, and adds a net name indicating a signal assigned to each of the pins to the symbol.

9 Claims, 31 Drawing Sheets

FOREIGN PATENT DOCUMENTS

| | | |
|---|---|---|
| EP | 0 304 865 | 3/1989 |
| JP | 6-12469 | 1/1994 |
| JP | 08-069486 | 3/1996 |
| JP | 9-259174 | 10/1997 |
| JP | 11-66118 | 3/1999 |
| JP | 11-85811 | 3/1999 |
| JP | 11-102379 | 4/1999 |
| JP | 11-282895 | 10/1999 |
| JP | 2000-123060 | 4/2000 |
| JP | 2001-188821 | 7/2001 |
| JP | 2001-325315 | 11/2001 |
| JP | 2003-233636 | 8/2003 |
| JP | 2004-234295 | 8/2004 |
| JP | 2004-287585 | 10/2004 |
| JP | 2005-149445 | 6/2005 |
| JP | 2006-350451 | 12/2006 |
| JP | 2007-233464 | 9/2007 |
| JP | 2008-165752 | 7/2008 |

OTHER PUBLICATIONS

U.S. Office Action mailed Jan. 20, 2010 in related U.S. Appl. No. 11/905,315.

U.S. Office Action mailed Feb. 5, 2010 in related U.S. Appl. No. 11/902,940.

M. E. Herniter, "PC Board Design and Fabrication using Schematics, PADS-PERFORM, and a Laser Printer", Frontiers in Education Conference, Nov. 2, 1994, pp. 111-115.

Extended European Search Report issued in corresponding European Patent Application No. 07117419.7, on Feb. 13, 2008.

U.S. Office Action mailed Apr. 22, 2010 in related U.S. Appl. No. 12/000,098.

U.S. Appl. No. 11/902,940, filed Sep. 26, 2007, Yoshitomo Kumagai, Fujitsu Limited.

U.S. Appl. No. 11/980,396, filed Oct. 31, 2007, Yoshitomo Kumagai, Fujitsu Limited.

U.S. Appl. No. 11/905,315, filed Sep. 28, 2007, Yoshitomo Kumagai, Fujitsu Limited.

U.S. Appl. No. 12/000,098, filed Dec. 7, 2007, Yoshitomo Kumagai, Fujitsu Limited.

European Search Report mailed Dec. 10, 2007 and issued in corresponding European Patent Application 07117466.8.

European Search Report mailed Feb. 13, 2008 and issued in corresponding European Patent Application 07117528.5.

Office Action mailed Jun. 24, 2009 for co-pending U.S. Appl. No. 11/905,315.

Chinese Office Action for corresponding Chinese Application No. 200710182366.5, issued on Oct. 8, 2010.

Japanese Notice of Rejection mailed Jan. 4, 2012 issued in corresponding Japanese Patent Application No. 2007-307150.

Japanese Notice of Rejection mailed Jan. 4, 2012 issued in corresponding Japanese Patent Application No. 2007-307153.

Office Action mailed Feb. 16, 2012 in copending U.S. Appl. No. 12/805,297.

Japanese Notice of Rejection mailed Feb. 28, 2012 issued in corresponding Japanese Patent Application No. 2007-307151.

* cited by examiner

| | LEVEL 1 | | | LEVEL 2 | |
|---|---|---|---|---|---|
| PCB | CONNECTOR | PIN | PCB | CONNECTOR | PIN |
| BWB | CN1 | + | | | |
| | CN2 | + | | | |

SELECT    CHECK

| | LEVEL 1 | | | LEVEL 2 | |
|---|---|---|---|---|---|
| PCB | CONNECTOR | PIN | PCB | CONNECTOR | PIN |
| BWB | CN1 | + | | | |
| | CN2 | + | | | |
| | | | PCB1 | CN1 | + |
| | | | PCB2 | CN2 | + |

SELECT    CHECK

| ASSOCIATION | | | | | | | | | | |
|---|---|---|---|---|---|---|---|---|---|---|
| LEVEL 1 | | | | LEVEL 2 | | | | | | |
| PCB | CONNECTOR | PIN | NET | PCB | CONNECTOR | PIN | NET | | | |
| BWB | CN1 | *A1 | D1 | PCB1 | CN1 | *A1 | D1 | | | |
| | | *A2 | D2 | | | *A2 | D2 | | | |
| | | A3 | D3 | | | A3 | D3 | | | |
| | | A4 | D4 | | | A4 | D4 | | | |
| | | A5 | D5 | | | A5 | D5 | | | |
| | | A6 | D6 | | | B1 | D6 | | | |
| | | A7 | D7 | | | B2 | D7 | | | |
| | | A8 | D8 | | | B3 | D8 | | | |
| | | A9 | D9 | | | B4 | D9 | | | |
| | | A10 | D10 | | | B5 | D10 | | | |

[OK] [CANCEL] [ASSOCIATION] [RELEASE]

ASSOCIATION

| | LEVEL 1 | | | | LEVEL 2 | | | |
|---|---|---|---|---|---|---|---|---|
| PCB | CONNECTOR | PIN▼ | NET | | PCB | CONNECTOR | PIN▼ | NET |
| BWB | CN1 | A1 | D1 | | PCB1 | CN1 | A1 | D1 |
| | | A10 | D10 | | | | A2 | D2 |
| | | A2 | D2 | | | | A3 | D3 |
| | | A3 | D3 | | | | A4 | D4 |
| | | A4 | D4 | | | | A5 | D5 |
| | | A5 | D5 | | | | B1 | D6 |
| | | A6 | D6 | | | | B2 | D7 |
| | | A7 | D7 | | | | B3 | D8 |
| | | A8 | D8 | | | | B4 | D9 |
| | | A9 | D9 | | | | B5 | D10 |

OK   CANCEL   ASSOCIATION   RELEASE

| ASSOCIATION | | | | | | | | |
|---|---|---|---|---|---|---|---|---|
| PCB | CONNECTOR | LEVEL 1 | | PCB | CONNECTOR | LEVEL 2 | | |
| | | PIN ▼ | NET | | | PIN ▼ | NET | |
| BWB | CN1 | A1 | D1 | PCB1 | CN1 | A1 | D1 | |
| | | A2 | D2 | | | A2 | D2 | |
| | | A3 | D3 | | | A3 | D3 | |
| | | A4 | D4 | | | A4 | D4 | |
| | | A5 | D5 | | | A5 | D5 | |
| | | A6 | D6 | | | B1 | D6 | |
| | | A7 | D7 | | | B2 | D7 | |
| | | A8 | D8 | | | B3 | D8 | |
| | | A9 | D9 | | | B4 | D9 | |
| | | A10 | D10 | | | B5 | D10 | |

OK    CANCEL    ASSOCIATION    RELEASE

| ASSOCIATION | | | | | | | | |
|---|---|---|---|---|---|---|---|---|
| LEVEL 1 | | | | LEVEL 2 | | | | |
| PCB | CONNECTOR | PIN ▼ | NET | PCB | CONNECTOR | PIN ▼ | NET | |
| BWB | CN1 | A1 | D1 | PCB1 | CN1 | A1 | D1 | |
| | | A2 | D6 | | | A2 | D2 | |
| | | A3 | D2 | | | A3 | D3 | |
| | | A4 | D7 | | | A4 | D4 | |
| | | A5 | D3 | | | A5 | D5 | |
| | | A6 | D8 | | | B1 | D6 | |
| | | A7 | D4 | | | B2 | D7 | |
| | | A8 | D9 | | | B3 | D8 | |
| | | A9 | D5 | | | B4 | D9 | |
| | | A10 | D10 | | | B5 | D10 | |

| OK | CANCEL | ASSOCIATION | RELEASE |

| ASSOCIATION | | | | | | | | |
|---|---|---|---|---|---|---|---|---|
| LEVEL 1 | | | | LEVEL 2 | | | | |
| PCB | CONNECTOR | PIN▼ | NET | PCB | CONNECTOR | PIN▼ | NET | |
| BWB | CN1 | A1 | D1 | PCB1 | CN1 | A1 | D1 | |
| | | A2 | D6 | | | B1 | D6 | |
| | | A3 | D2 | | | A2 | D2 | |
| | | A4 | D7 | | | B2 | D7 | |
| | | A5 | D3 | | | A3 | D3 | |
| | | A6 | D8 | | | B3 | D8 | |
| | | A7 | D4 | | | A4 | D4 | |
| | | A8 | D9 | | | B4 | D9 | |
| | | A9 | D5 | | | A5 | D5 | |
| | | A10 | D10 | | | B5 | D10 | |

[OK]  [CANCEL]  [ASSOCIATION]  [RELEASE]

| ASSOCIATION | | | | | | | |
|---|---|---|---|---|---|---|---|
| LEVEL 1 | | | | LEVEL 2 | | | |
| PCB | CONNECTOR | PIN | NET▶ | PCB | CONNECTOR | PIN | NET▶ |
| BWB | CN1 | A1 | D1 | PCB1 | CN1 | A1 | D1 |
| | | A10 | D10 | | | B5 | D10 |
| | | A3 | D2 | | | A2 | D2 |
| | | A5 | D3 | | | A3 | D3 |
| | | A7 | D4 | | | A4 | D4 |
| | | A9 | D5 | | | A5 | D5 |
| | | A2 | D6 | | | B1 | D6 |
| | | A4 | D7 | | | B2 | D7 |
| | | A6 | D8 | | | B3 | D8 |
| | | A8 | D9 | | | B4 | D9 |

OK  CANCEL  ASSOCIATION  RELEASE

ASSOCIATION

| PCB | CONNECTOR | PIN | NET▶ |
|---|---|---|---|
| PCB1 | CN1 | A1 | A-DT1 |
| | | A2 | A-DT2 |
| | | A3 | A-DT3 |
| | | A4 | A-DT4 |
| | | A5 | A-DT5 |
| | | B1 | B-DT1 |
| | | B2 | B-DT2 |
| | | B3 | B-DT3 |
| | | B4 | B-DT4 |
| | | B5 | B-DT5 |

LEVEL 2

| PCB | CONNECTOR | PIN | NET▶ |
|---|---|---|---|
| PCB2 | CN2 | A1 | A-DT1 |
| | | A2 | A-DT2 |
| | | A3 | A-DT3 |
| | | A4 | A-DT4 |
| | | A5 | A-DT5 |
| | | B1 | B-DT1 |
| | | B2 | B-DT2 |
| | | B3 | B-DT3 |
| | | B4 | B-DT4 |
| | | B5 | B-DT5 |

LEVEL 2

[OK] [CANCEL] [ASSOCIATION] [RELEASE]

| CHECK | | | | | | | | |
|---|---|---|---|---|---|---|---|---|
| FILE (F)  OPTION (O) | | | | | | | | |
| ✕ | LEVEL 1 | | | LEVEL 2 | | | | |
| | PCB | CONNECTOR | PIN | NET | PCB | CONNECTOR | PIN | NET |
| | BWB | CN1 | A1 | D1 | PCB1 | CN1 | A1 | D1 |
| | | | A2 | D2 | | | A2 | D2 |
| | | | A3 | D3 | | | A3 | D3 |
| | | | A4 | D4 | | | A4 | D4 |
| | | | A5 | D5 | | | A5 | D5 |
| | | | A6 | D6 | | | B1 | D6 |
| | | | A7 | D7 | | | B2 | D7 |
| | | | A8 | D8 | | | B3 | D8 |
| | | | A9 | D9 | | | B4 | D9 |
| | | | A10 | D10 | | | B5 | D0 |
| | | − | + | | | − | + | |
| | | CN2 | | | PCB2 | CN2 | | |

SELECT   CHECK

FIG.20

PARENT

CHILD

```
#ASSOCIATION FILE
#CREATED DATE     2006/11/7  14:27
@UNIT
#VERSION, PCB
HS8276-C201,BWB
HS8276-C301,PCB1
@CONNECT
#
#CONNECTION METHOD,PCB, PART, ACCESS KEY, PIN, NET, TRANSPARENT NET,
PCB, PART, ACCESS KEY, PIN, NET, TRANSPARENT NET
CN,BWB,CN1,TA52002-0427A9,A1,D1,,PCB1,CN1,TA52002-0427B9,A1,D1,A-DT1
CN,BWB,CN1,TA52002-0427A9,A2,D2,,PCB1,CN1,TA52002-0427B9,A2,D2,A-DT2
CN,BWB,CN1,TA52002-0427A9,A3,D3,,PCB1,CN1,TA52002-0427B9,A3,D3,A-DT3
CN,BWB,CN1,TA52002-0427A9,A4,D4,,PCB1,CN1,TA52002-0427B9,A4,D4,A-DT4
CN,BWB,CN1,TA52002-0427A9,A5,D5,,PCB1,CN1,TA52002-0427B9,A5,D5,A-DT5
@UNCONNECT
#PCB, PART, ACCESS KEY, PIN, NET, TRANSPARENT NET
BWB,CN1,TA52002-0427A9,A6,D6,
BWB,CN1,TA52002-0427A9,A7,D7,
BWB,CN1,TA52002-0427A9,A8,D8,
BWB,CN1,TA52002-0427A9,A9,D9,
BWB,CN1,TA52002-0427A9,A10,D10,
PCB1,CN1,TA52002-0427B9,B1,D6,B-DT1
PCB1,CN1,TA52002-0427B9,B2,D7,B-DT2
PCB1,CN1,TA52002-0427B9,B3,D8,B-DT3
PCB1,CN1,TA52002-0427B9,B4,D9,B-DT4
PCB1,CN1,TA52002-0427B9,B5,D10,B-DT5
```

| DRAWING NUMBER | PCB | UPDATED DATE | ... |
|---|---|---|---|
| HS8276-C301 | PCB1 | 11/3/2006 11:54 | ... |

351b

| PART | LIBRARY ACCESS KEY | ... |
|---|---|---|
| CN1 | TA52002-0427B9 | ... |

351c

| PIN | NET | LOGICALLY-TRANSPARENT NET | ... |
|---|---|---|---|
| A1 | D1 | A-DT1 | ... |
| A2 | D1 | A-DT2 | ... |
| ... | ... | ... | ... |

| PARENT PCB | PARENT PART | CHILD PCB | CHILD PART |
|---|---|---|---|
| BWB | CN1 | PCB1 | CN1 |

352b

| PARENT PIN | CHILD PIN |
|---|---|
| A1 | A1 |
| A2 | A2 |
| ... | ... |

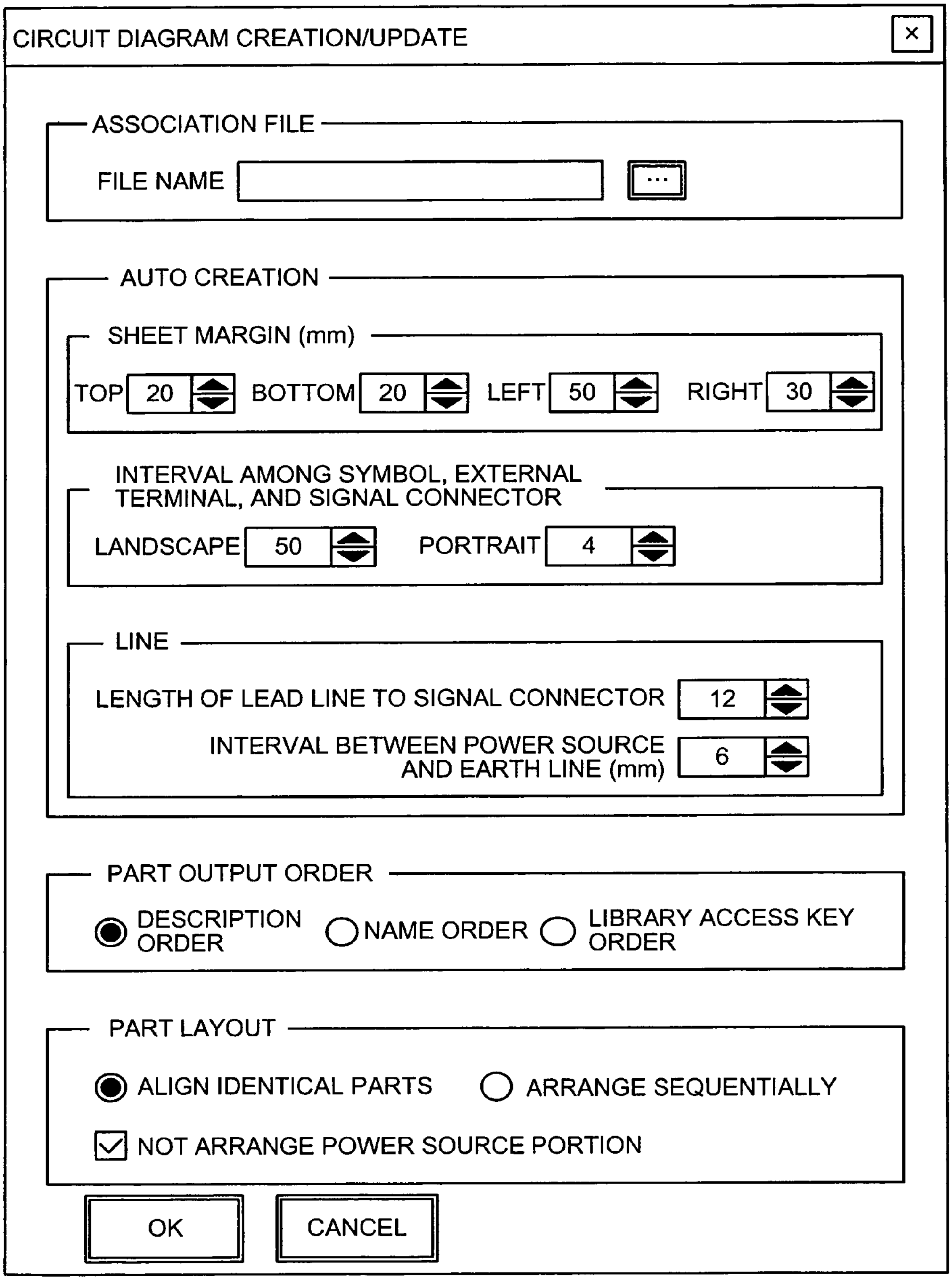

FIG.25

CIRCUIT DIAGRAM CREATION/UPDATE [x]

ASSOCIATION FILE
FILE NAME [_____] [...]

AUTO CREATION

SHEET MARGIN (mm)
TOP [20] BOTTOM [20] LEFT [50] RIGHT [30]

INTERVAL AMONG SYMBOL, EXTERNAL TERMINAL, AND SIGNAL CONNECTOR
LANDSCAPE [50] PORTRAIT [4]

LINE
LENGTH OF LEAD LINE TO SIGNAL CONNECTOR [12]
INTERVAL BETWEEN POWER SOURCE AND EARTH LINE (mm) [6]

PART OUTPUT ORDER
(●) DESCRIPTION ORDER    ( ) NAME ORDER    ( ) LIBRARY ACCESS KEY ORDER

PART LAYOUT
(●) ALIGN IDENTICAL PARTS    ( ) ARRANGE SEQUENTIALLY
[✓] NOT ARRANGE POWER SOURCE PORTION

[ OK ]   [ CANCEL ]

CAD APPARATUS, METHOD, AND COMPUTER PRODUCT FOR DESIGNING PRINTED CIRCUIT BOARD

BACKGROUND OF THE INVENTION

1. Field of the Invention

The present invention relates to a computer aided design (CAD) apparatus, a method, and a computer product for designing a printed circuit board.

2. Description of the Related Art

An electronic circuit that controls an information processing apparatus, a communication device, or the like generally includes a plurality of printed circuit boards connected to each other via connectors. Design work of such an electronic circuit requires to check whether signals are correctly assigned to pins of the connectors by comparing pieces of design information of the printed circuit boards.

To easily and reliably perform the checking operation, some conventional technologies have been proposed. For example, Japanese Patent Application Laid-Open No. H8-69486 discloses a connector-information check apparatus. The connector-information check apparatus reads attribute information of a connector pin and a signal from a circuit diagram-file of a printed circuit board and that from a circuit diagram file of another printed circuit board to be connected to the former one, and compares the pieces of the attribute information. Japanese Patent Application Laid-Open No. 2001-325315 discloses a multi-PCB-connection design support apparatus. The multi-PCB-connection design support apparatus logically traces a signal line between printed circuit boards connected via a back wiring board to verify that a signal is correctly assigned to a connector pin.

The conventional technologies improve efficiency of the checking operation performed after design of printed circuit boards to be connected via connectors is once completed; however, these technologies do not improve efficiency of designing a printed circuit board itself. Recently, a product is developed in a shorter span, and thus, there is a need of a technology for improving efficiency of designing a printed circuit board.

SUMMARY OF THE INVENTION

It is an object of the present invention to at least partially solve the problems in the conventional technology.

According to an aspect of the present invention, computer aided design (CAD) apparatus for designing a circuit diagram, includes an association-data acquiring unit that acquires association data that defines an association between a pin of a first connector and a pin of a second connector to be connected to the first connector and an assignment of a signal to the pins, a part-information acquiring unit that acquires information including a symbol of the first connector, a layout-condition acquiring unit that acquires a layout condition to lay out the symbol on the circuit diagram, and a circuit diagram editing unit that lays out, when the symbol has not yet been laid out on the circuit diagram, the symbol on the circuit diagram based on the layout condition, and adds a net name indicating the signal assigned to the pins to the symbol.

According to another aspect of the present invention, a method of designing a circuit diagram includes acquiring association data that defines an association between a pin of a first connector and a pin of a second connector to be connected to the first connector and an assignment of a signal to the pins, acquiring information including a symbol of the first connector, acquiring a layout condition to lay out the symbol on the circuit diagram, and laying out, when the symbol has not yet been laid out on the circuit diagram, the symbol on the circuit diagram based on the layout condition, and adding a net name indicating the signal assigned to the pins to the symbol.

According to still another aspect of the present invention, a computer-readable recording medium stores therein a computer program that implements the above method on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 20 is an example of contents of an association file;

FIG. 21 is an example of the structure of design data;

FIG. 22 is an example of the structure of association data;

FIG. 25 is an example of a circuit-diagram creation/update screen;

DETAILED DESCRIPTION OF THE PREFERRED EMBODIMENTS

Exemplary embodiments of the present invention are explained in detail below with reference to the accompanying drawings.

Figure 1:
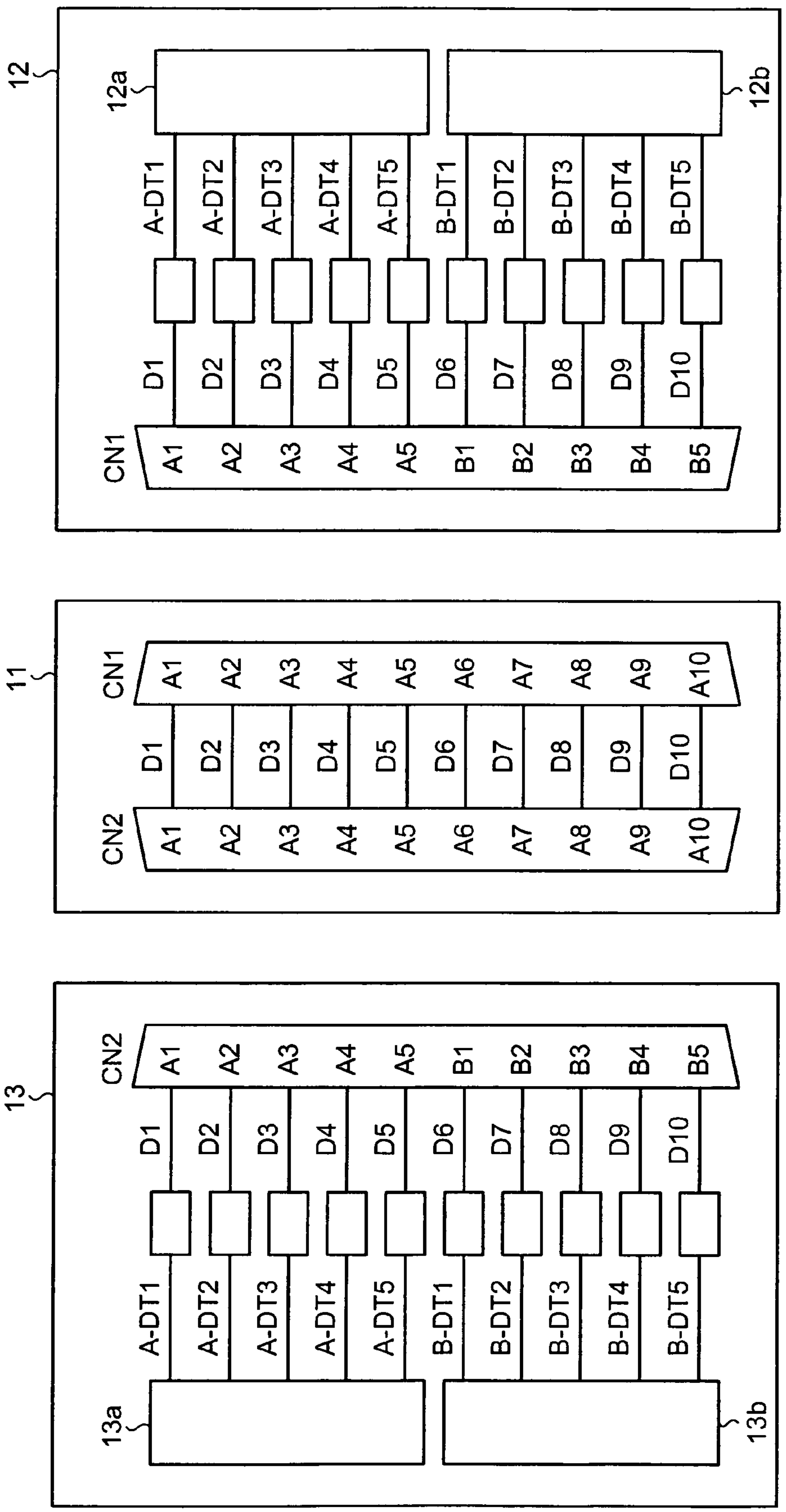
FIG. 1 is an example of printed circuit boards to be connected by a connector.

An embodiment of the present invention is explained with a printed circuit board (PCB) 11 shown in FIG. 1 as an example. The printed circuit board 11 is a back wiring board (BWB) for connecting printed circuit boards 12 and 13 with each other, and includes connectors CN1 and CN2. The connectors CN1 and CN2 each include 10 pins A1 to A10. Among the pins A1 to A10 of the connectors CN1 and CN2, respective sets of pins having the same pin name are connected via signal lines with net names D1 to D10.

The printed circuit board 12 has a predetermined function, and includes a connector CN1 to be connected to the connector CN1 of the printed circuit board 11. The connector CN1 includes 10 pins A1 to A5 and B1 to B5.

The pins A1 to A5 are connected to an integrated circuit (IC) 12*a* via a part such as a resistor. Signal lines with net names D1 to D5 connects the pins A1 to A5 to resistors or the like, respectively, while signal lines with net names A-DT1 to A-DT5 connects the resistors or the like to the IC 12*a*, respectively.

Similarly, the pins B1 to B5 are connected to an IC 12*b* via a part such as a resistor. Signal lines with net names D6 to D10 connects the pins B1 to B5 to resistors or the like, respectively, while signal lines with net names B-DT1 to B-DT5 connects the resistors or the like to the IC 12*b*, respectively.

The printed circuit board 13 has a predetermined function, and includes a connector CN2 to be connected to the connector CN2 of the printed circuit board 11. The connector CN2 includes 10 pins A1 to A5 and B1 to B5.

The pins A1 to A5 are connected to an IC 13*a* via a part such as a resistor. Signal lines with net names D1 to D5 connects the pins A1 to A5 to resistors or the like, respectively, while signal lines with net names A-DT1 to A-DT5 connects the resistors or the like to the IC 13*a*, respectively.

Similarly, the pins B1 to B5 are connected to an IC 13*b* via a part such as a resistor. Signal lines with net names D6 to D10 connects the pins B1 to B5 to resistors or the like, respectively, while signal lines with net names B-DT1 to B-DT5 connects the resistors or the like to the IC 13*b*, respectively.

Figure 2:
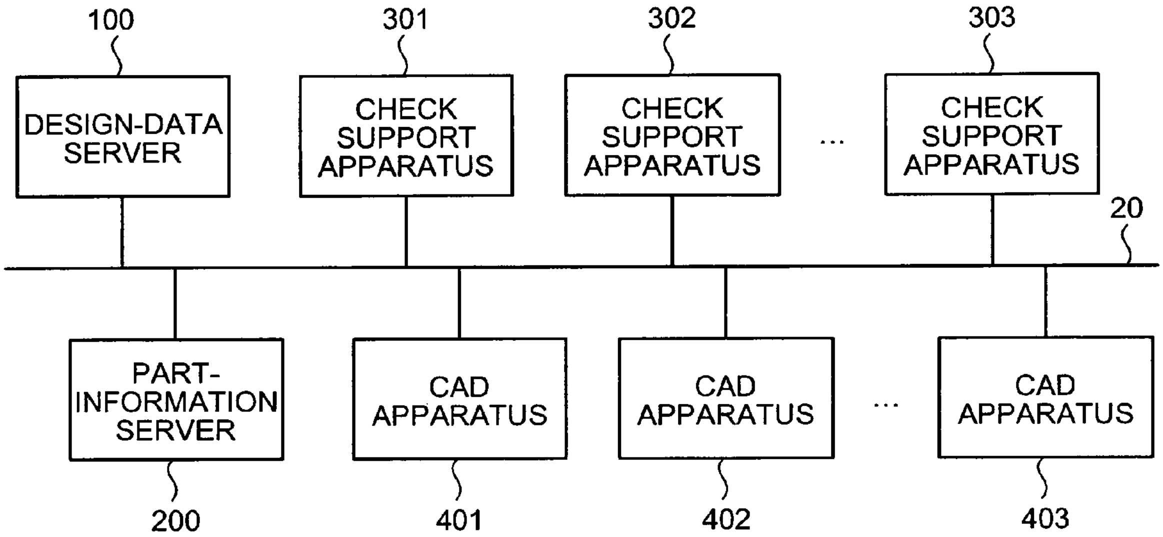
FIG. 2 is a schematic diagram of a design support system according to an embodiment of the present invention.

FIG. 2 is a schematic diagram of a design support system according to the embodiment. The design support system is effective for designing a printed circuit board to be connected to another printed circuit board. The design support system includes a design-data server 100, a part-information server 200, check support apparatuses 301 to 303, and computer aided design (CAD) apparatuses 401 to 403, which are connected one another via a network 20 such as a local area network (LAN).

The design-data server 100 manages design data such as a designed circuit diagram and the like, and stores therein association definition data created by the check support apparatuses 301 to 303 as a portion of the design data. The part-information server 200 manages symbols or specification information of various parts necessary for editing a circuit diagram.

The check support apparatuses 301 to 303 provide an assistance to effectively and reliably verify that signals are correctly assigned to connector pins between printed circuit boards to be connected. The CAD apparatuses 401 to 403 are used for electronically designing a printed circuit board and the like.

The configuration of the design support system shown in FIG. 2 is merely one example, and can be modified as required. For example, the design-data server 100 and the part-information server 200 can be integrated into one server, or the check support apparatus 301 and the CAD apparatus 401 can be integrated into one apparatus.

The check support apparatuses 301 to 303 are explained below. The check support apparatuses 301 to 303 are of like configuration and function in the same manner, and thus but one of them, the check support apparatus 301 is explained in detail.

Figure 3:
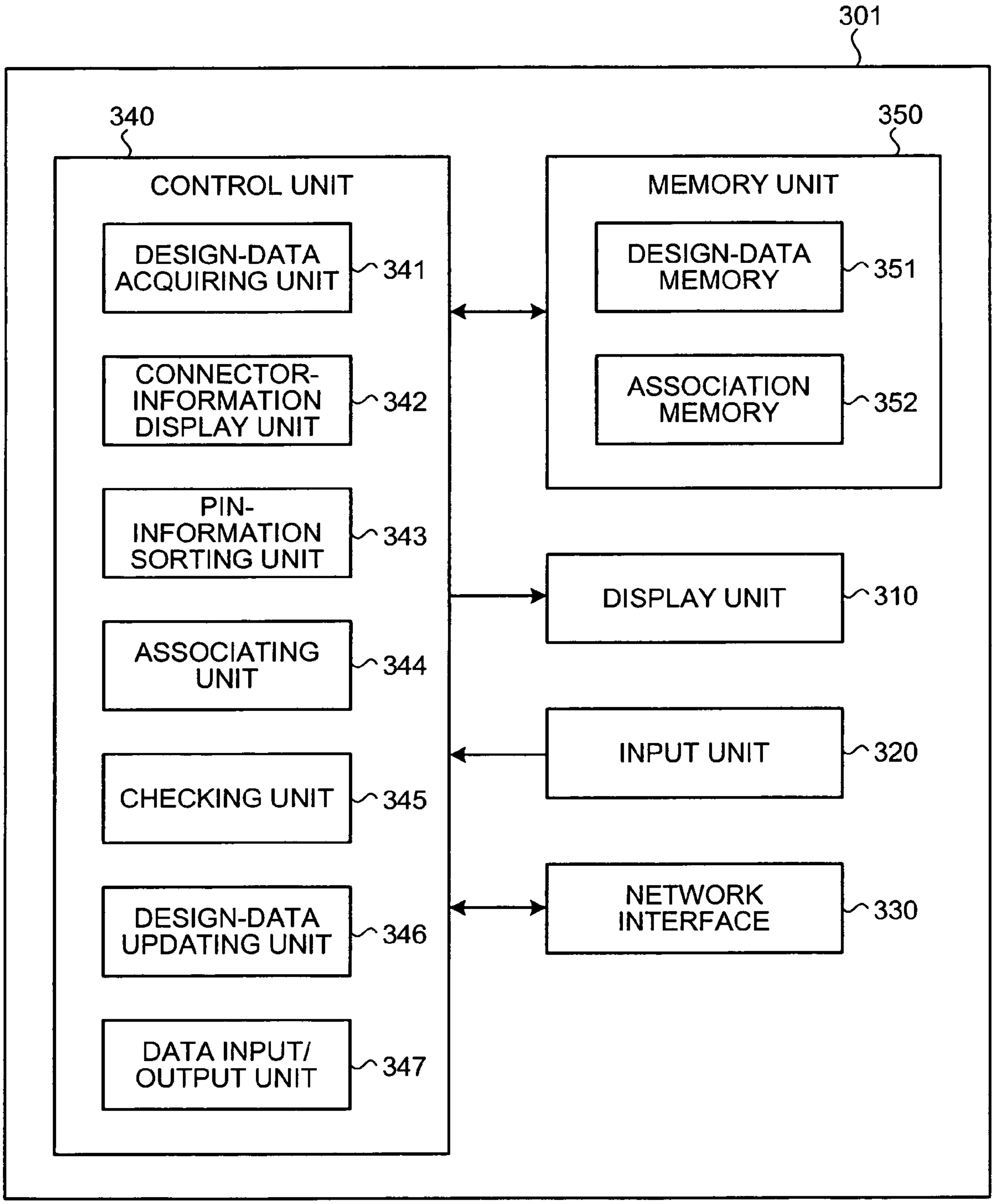
FIG. 3 is a functional block diagram of a check support apparatus shown in FIG. 2.

FIG. 3 is a functional block diagram of the check support apparatus 301. The check support apparatus 301 includes a display unit 310, an input unit 320, a network interface 330, a control unit 340, and a memory unit 350.

The display unit 310 displays various types of information, and includes a liquid crystal display or the like. The input unit 320 is used by a user to provide various types of information, commands and the like. Examples of the input unit 320 include a keyboard, and a mouse. The network interface 330 is an interface for exchanging information with other devices via the network 20.

The control unit 340 controls the check support apparatus 301. The control unit 340 includes a design-data acquiring unit 341, a connector-information display unit 342, a pin-information sorting unit 343, an associating unit 344, a checking unit 345, a design-data updating unit 346, and a data input/output unit 347.

The design-data acquiring unit 341 acquires design data specified by the design-data server 100 or by the CAD apparatuses 401 to 403. The connector-information display unit 342 displays, on the display unit 310, information on a connector included in the design data acquired by the design-data acquiring unit 341. The pin-information sorting unit 343 sorts information on pins displayed by the connector-information display unit 342 in a predetermined order. The associating unit 344 defines an association of pins to be connected.

Figure 4:
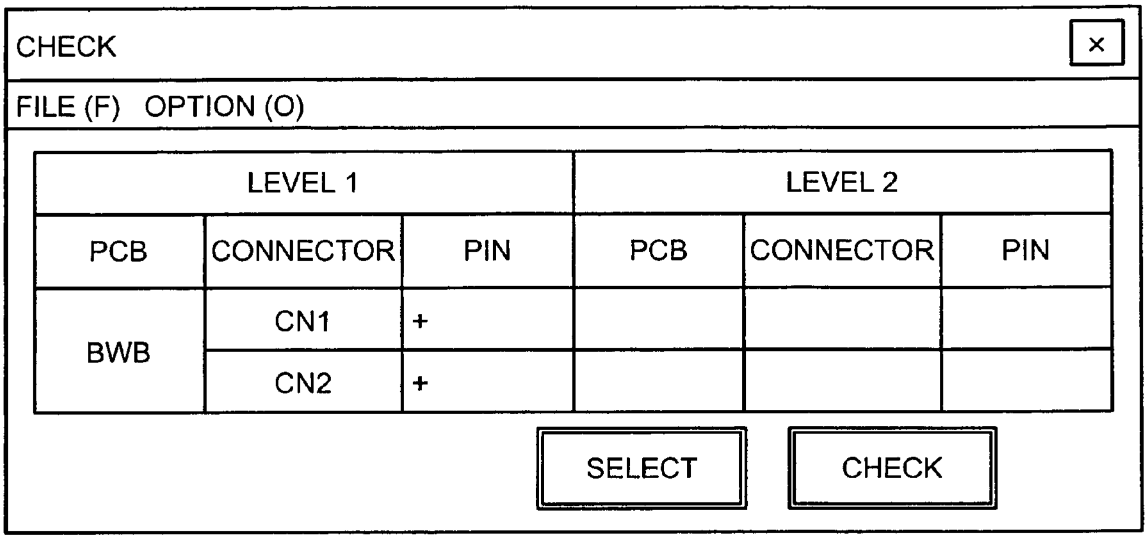
FIG. 4 is an example of a check screen that displays information on a printed circuit board of level 1.

Concrete examples of processes performed by the connector-information display unit 342, the pin-information sorting unit 343, and the associating unit 344 are explained below. FIG. 4 is an example of a check screen displayed by the connector-information display unit 342 on the display unit 310. The check screen as shown in FIG. 4 is displayed after the check support apparatus 301 reads design data corresponding to the printed circuit board 11 as a printed circuit board of level 1.

The design-data acquiring unit 341 acquires design data from the design-data server 100 in response to an instruction from a user. The design-data acquiring unit 341 exclusively extracts connector information from the design data, and stores the connector information in a design-data memory 351 of the memory unit 350. The connector-information display unit 342 displays the connector information on the check screen. In the example shown in FIG. 4, the check screen indicates that the printed circuit board BWB of level 1 includes the connectors CN1 and CN2.

In FIG. 4, a box in "Pin" column is simply marked with a symbol "+" to avoid complication due to display of all pieces of information on each pin. If the user selects a box ("+") with a mouse or the like, the connector-information display unit 342 displays a list of information on pins included in a corresponding connector.

Upon receiving an instruction to read design data corresponding to the printed circuit boards 12 and 13 as printed circuit boards of level 2 through the input unit 320, the design-data acquiring unit 341 acquires the design data, and exclusively extracts connector information from the design data.

Figure 5:
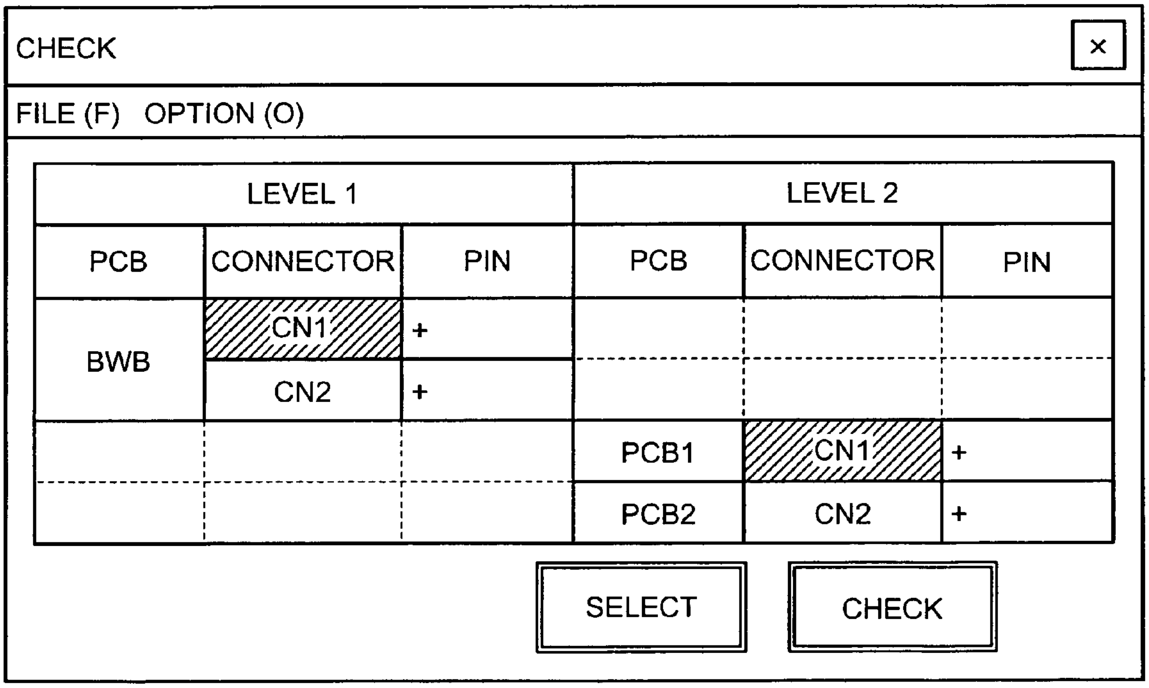
FIG. 5 is the check screen of FIG. 4 that further displays information on a printed circuit board of level 2.

The connector-information display unit 342 acquires the connector information, and updates the check screen as shown in FIG. 5.

Referring to FIG. 5, a printed circuit board PCB1 of level 2 includes the connector CN1, and a printed circuit board PCB2 of level 2 includes the connector CN2 in addition that the printed circuit board BWB of level 1 includes two connectors.

As can be seen in FIG. 5, if the user specifies different levels of printed circuit boards to be connected, the connector-information display unit 342 displays pieces of information on connectors included in the printed circuit boards on different rows in columns of the respective levels.

In this case, for verifying an assignment of signals to the connector CN1 of the printed circuit board BWB and to the connector CN1 of the printed circuit board PCB1, the user selects the connectors CN1 on the check screen, and presses "Select" key. Subsequently, the connector-information display unit 342 displays a list of pin information of the connectors CN1 on an association screen.

Figure 6:
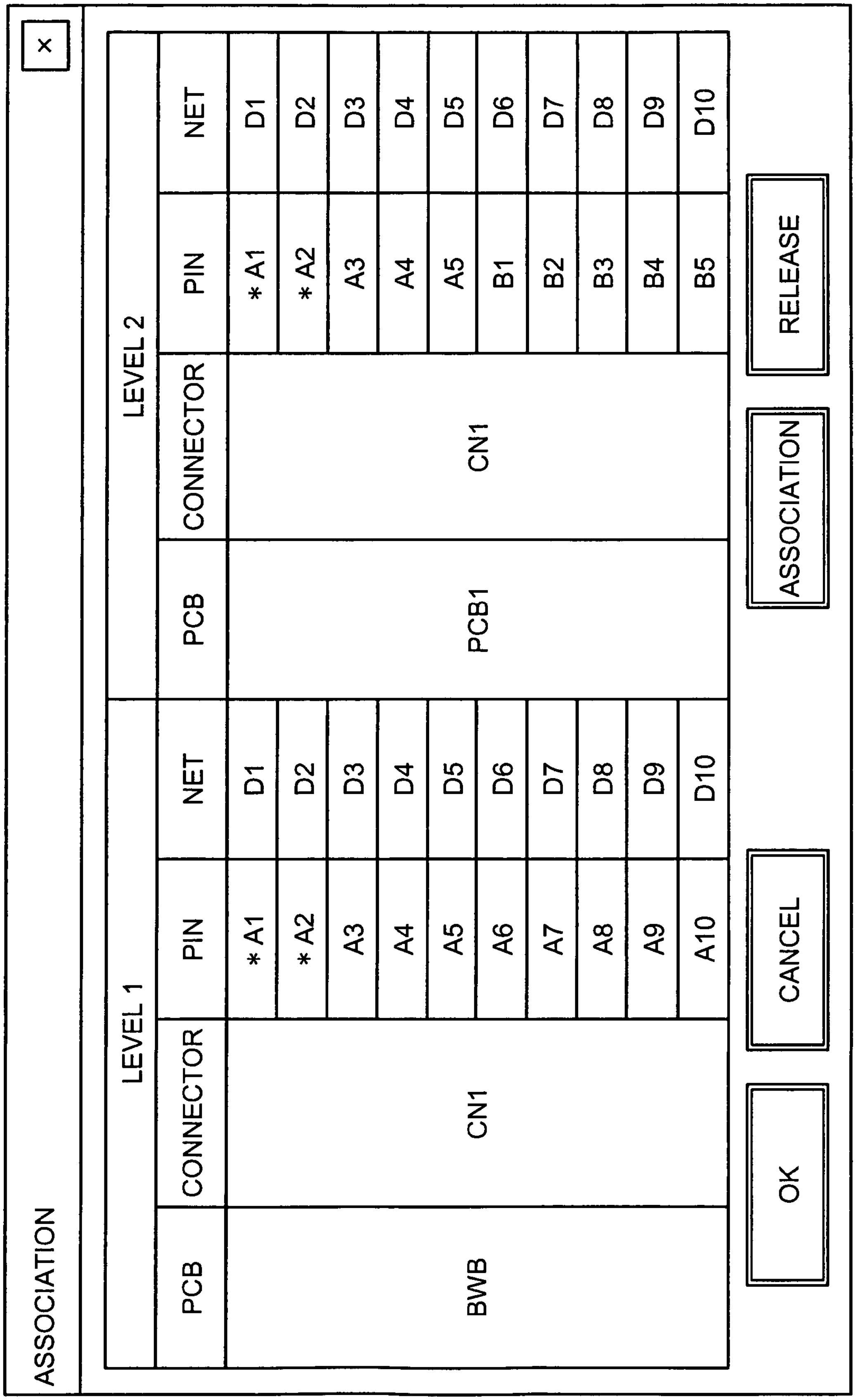
FIG. 6 is an example of an association screen that displays two sets of associated pins.

An example of the association screen is shown in FIG. 6. As shown in FIG. 6, a list of net names and pin names of pins included in the selected connectors CN1 is displayed on the association screen. With the association screen, the user checks whether signals assigned to the pins are correct based on the list of pin information for the two connectors CN1.

Specifically, the user recognizes an association between pins respectively included in the two connectors CN1 based on the pin names, and checks whether a signal assigned to an associated pair of the pins is correct based on the net names of the pins. If a signal is correctly assigned to the pins, the user selects the associated pair of the pins, and presses "Association" key.

If "Association" key is pressed, the associating unit 344 stores the association of the selected pins in an association memory 352 of the memory unit 350. The connector-information display unit 342 adds an asterisk "*" to the top of the name of each selected pin. Pieces of information on the pins are displayed on the same row.

In this manner, an asterisk "*" is added to the top of the name of the associated pins, and such pins are displayed on the same row. In the example shown in FIG. 6, a pin A1 of the printed circuit board BWB is associated with a pin A1 of the printed circuit board PCB1, and a signal is correctly assigned to them. Besides, a pin A2 of the printed circuit board BWB is associated with a pin A2 of the printed circuit board PCB1, and a signal is correctly assigned to them.

As described above, the association screen is configured to display a list of pin information of connectors to facilitate a user to check the association between pins and to check whether signals are correctly assigned to the pins. Therefore, it is possible to effectively verify that signals are correctly assigned to pins even when the pin names of the associated pins are different from each other. While, in the above example, an asterisk "*" is added to the top of pin names to discriminate an associated pair of pins, a color of a box or indication of the pins can be changed instead.

On the other hand, the connector-information display unit 342 displays pin information on the association screen as a default screen in order as pins have been stored in design data. In the example shown in FIG. 6, the pin information of the printed circuit board BWB and the pin information of the printed circuit board PCB1 are stored in a proper order, and pieces of information on associated pins are displayed on the same row. As a result, the user can easily compare the pieces of the pin information.

However, pin information is not always stored in a preferable order depending on design data. Accordingly, the pin-information sorting unit 343 sorts pin information in a manner previously specified by the user when, for example, the header or the title box of "Pin" column is selected.

The pin-information sorting unit 343 can sort pin information in order as pins have been stored in design data, or sort pin information by using a pin name. The pin-information sorting unit 343 can use a whole pin name as a character string, or divide it into a character portion and a numeral portion to sort pin information on a character basis or a numeral basis. Concrete examples other than sorting in stored order are explained in detail below.

Figure 7:
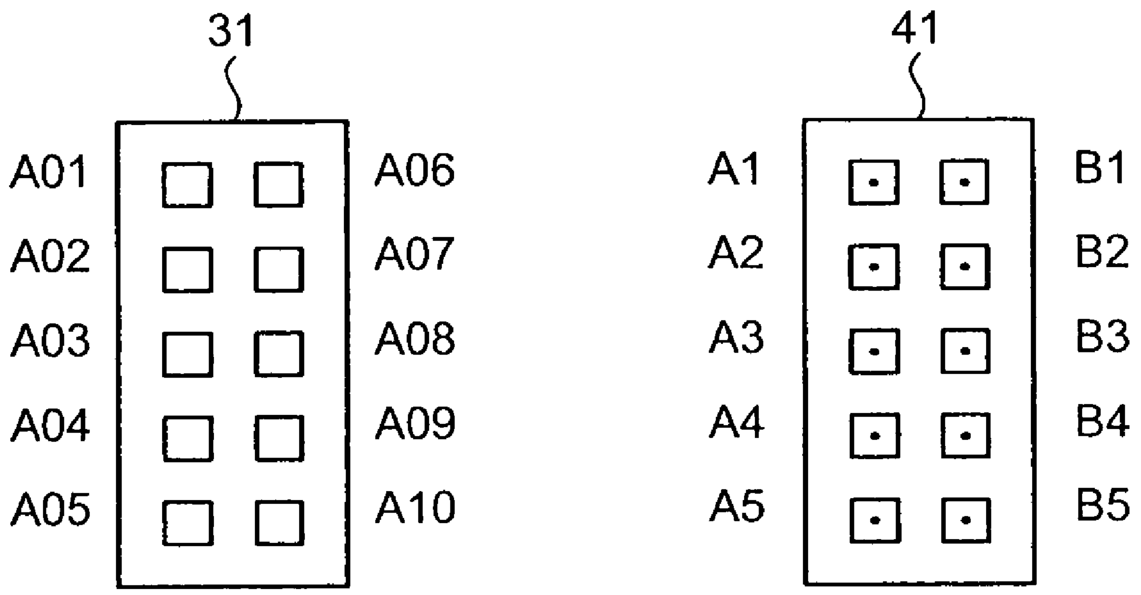
FIG. 7 is an example of physical layout of pins.
Figure 8:
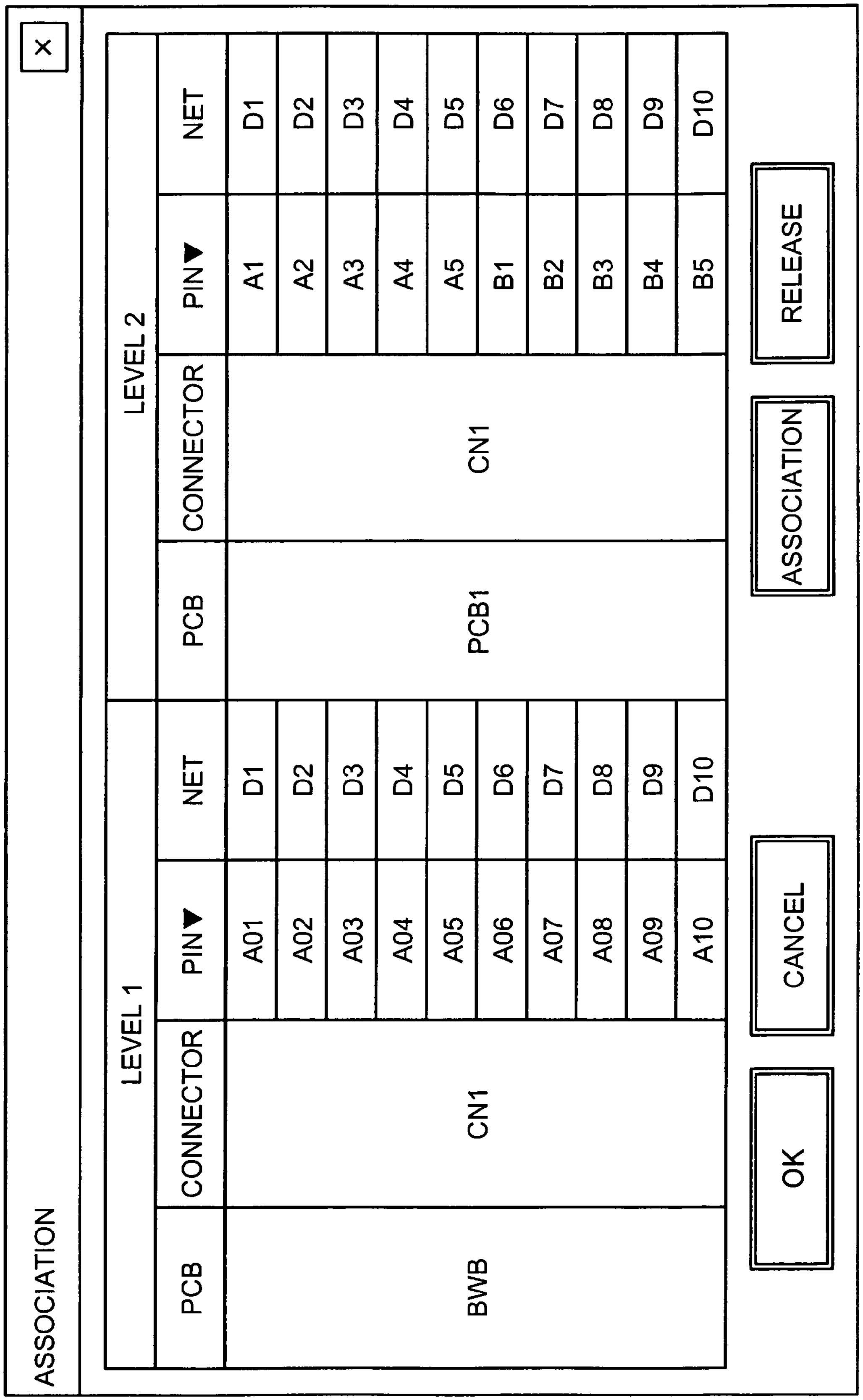
FIG. 8 is an example of the association screen after pin information is sorted.

First, it is assumed that a pin name of each pin in the connector CN1 of the printed circuit board BWB has a numeral portion embedded with zero as in a connector 31 shown in FIG. 7, while a pin name of each pin in the connector CN1 of the printed circuit board PCB1 has a one-digit numeral portion as in a connector 41 shown in FIG. 7. In this case, as shown in FIG. 8, associated pins are displayed on the same row by sorting pin information using a whole pin name as a character string.

When pin information is sorted by using a whole pin name as a character string, pin names are simply sorted by American standard code for information interchange (ASCII) code order. This method is effective when the numeral portions of respective pin names have the same number of digits.

Figure 9:
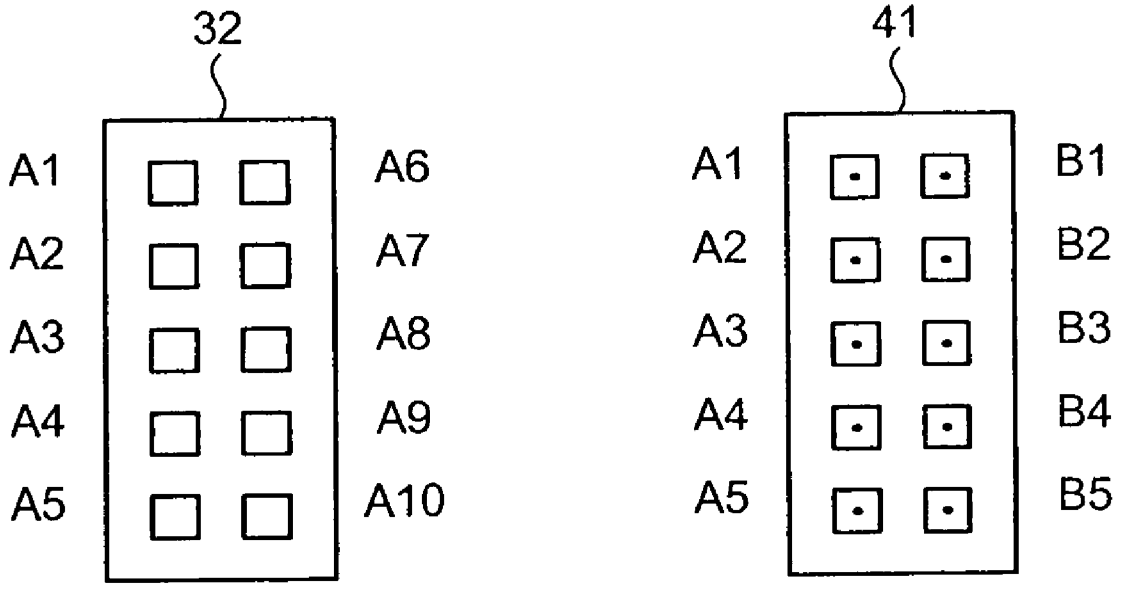
FIG. 9 is another example of physical layout of pins.
Figure 10:
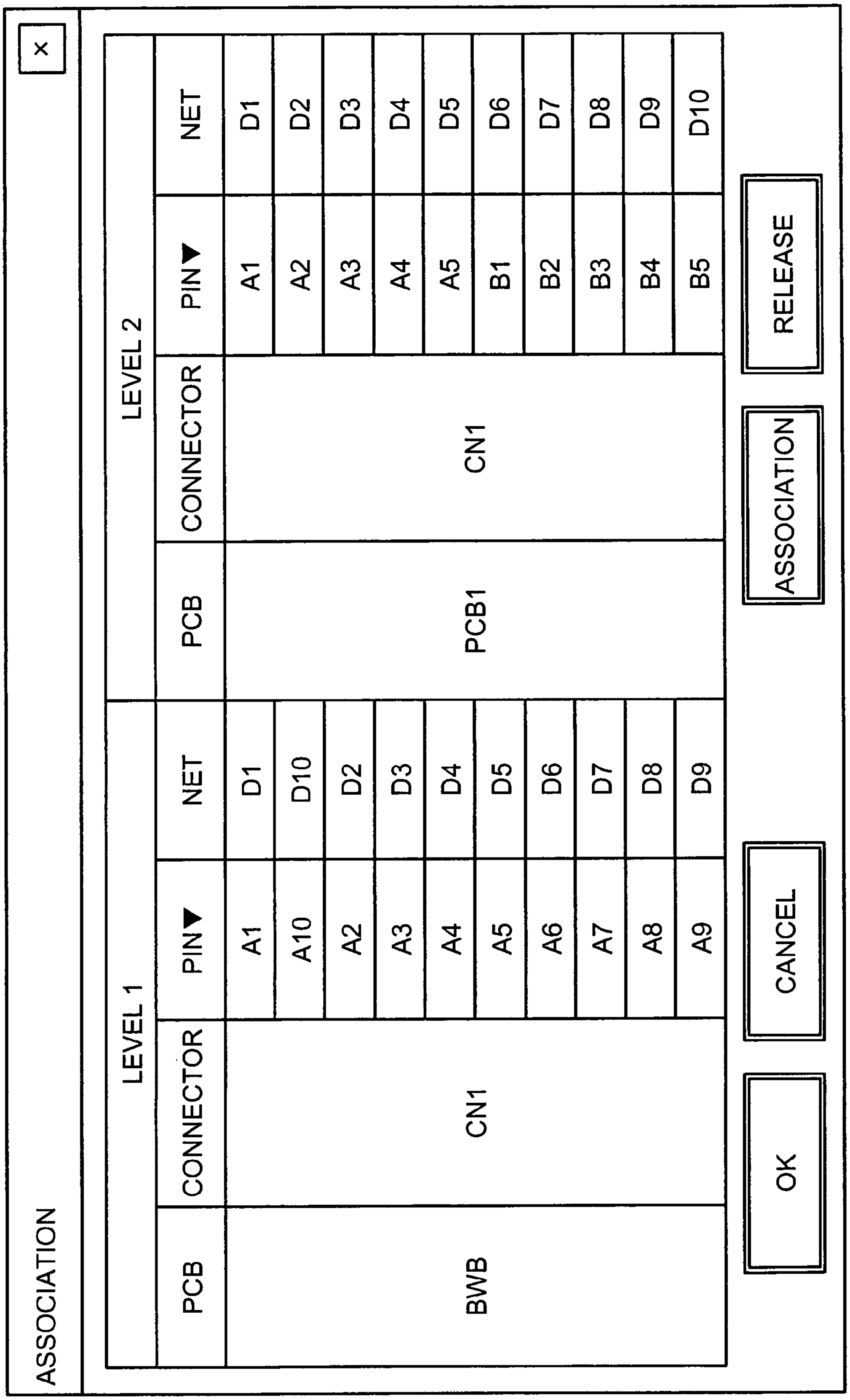
FIGS. 10 and 11 are other examples of the association screen after pin information is sorted.

Second, it is assumed that a pin name of each pin in the connector CN1 of the printed circuit board BWB has a numeral portion without zero embedded as in a connector 32 shown in FIG. 9, while a pin name of each pin in the connector CN1 of the printed circuit board PCB1 is set as in the connector 41 shown in FIG. 7. In this case, as shown in FIG. 10, if pin information is sorted by using a whole pin name as a character string, associated pins are displayed in different rows.

Figure 11:
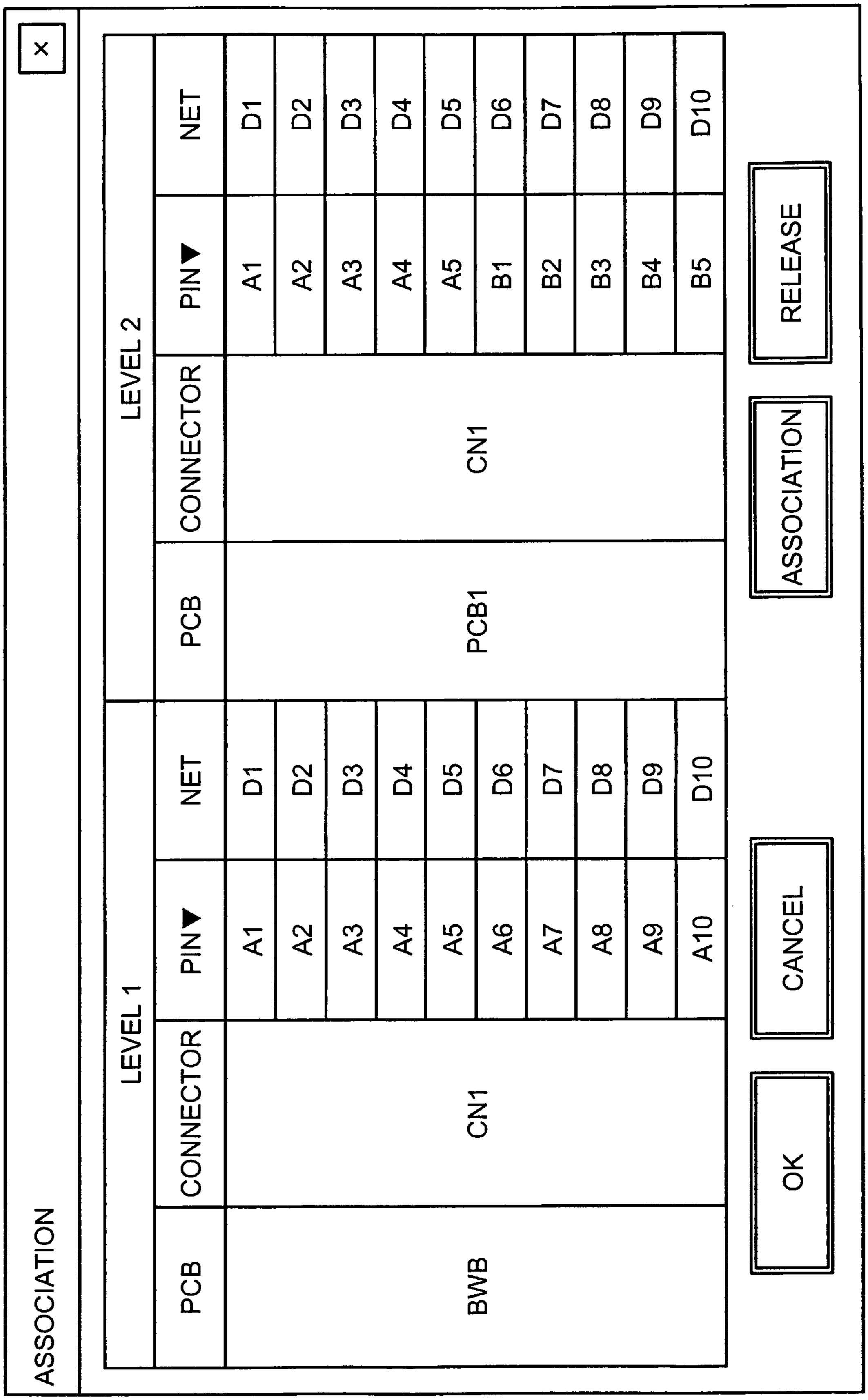

Thus, pin information is sorted on a character basis by dividing each pin name into a character portion and a numeral portion, whereby associated pins are displayed on the same row as shown in FIG. 11. In this method, after the numeral portions of pin names are sorted by a numeric order, the character portions are sorted by ASCII code order.

Figure 12:
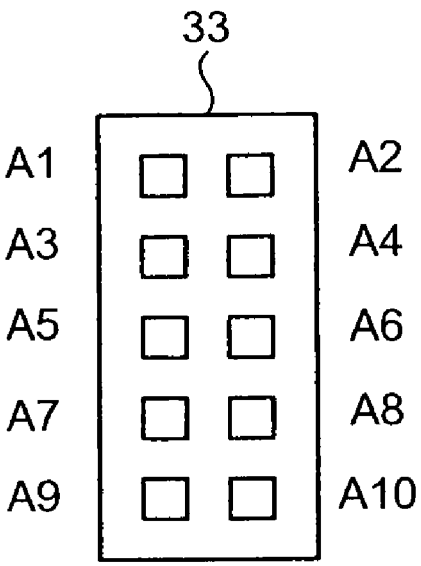
FIG. 12 is another example of physical layout of pins.
Figure 13:
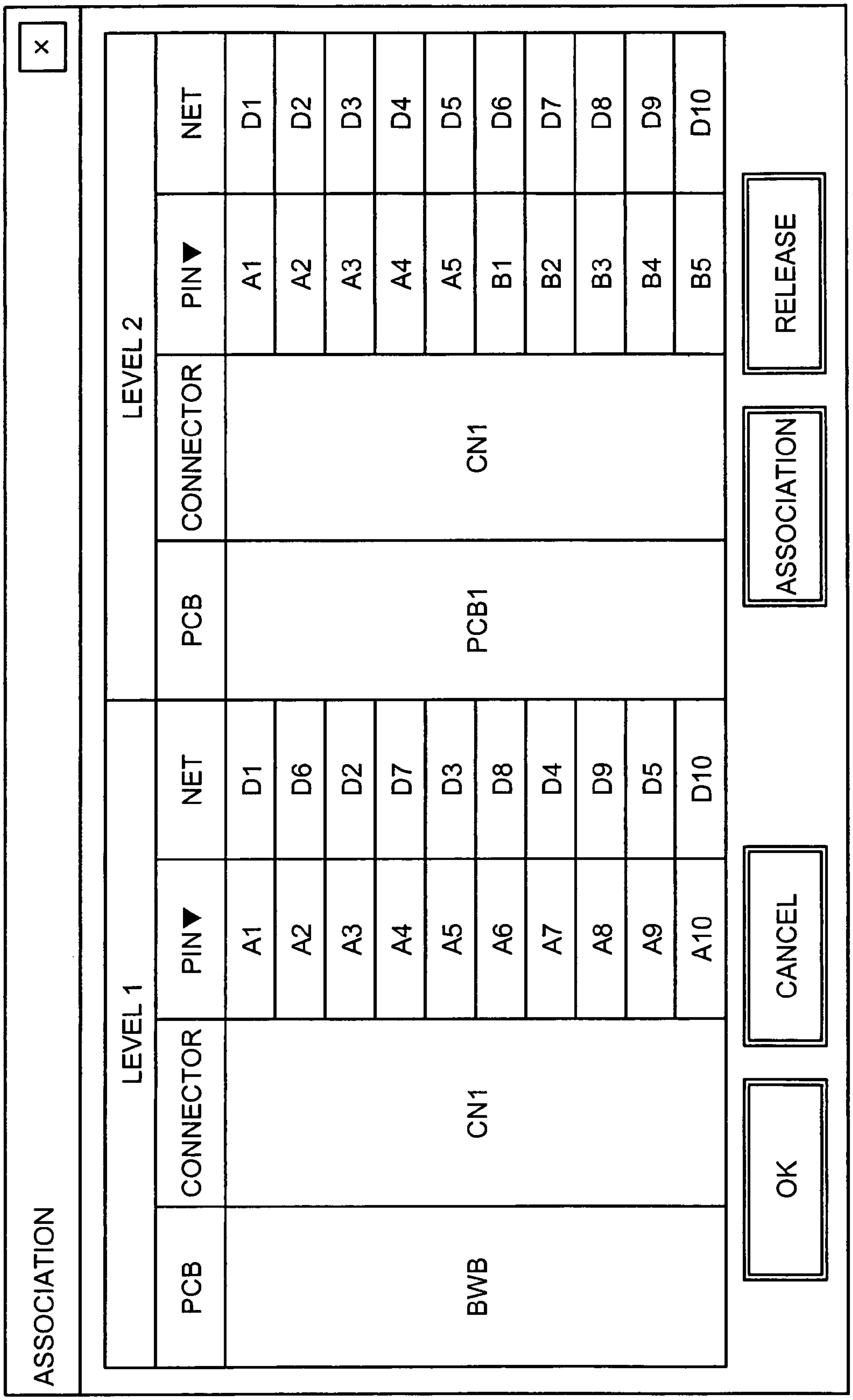
FIGS. 13 to 16 are other examples of the association screen after pin information is sorted.

Third, it is assumed that pin names of pins in the connector CN1 of the printed circuit board BWB are set as those in a connector 33 shown in FIG. 12, which are set in a different order than those in the connector 41. In this case, as shown in FIG. 13, if pin information is sorted on a character basis by dividing each pin name into a character portion and a numeral portion, associated pins are displayed in different rows.

Figure 14:
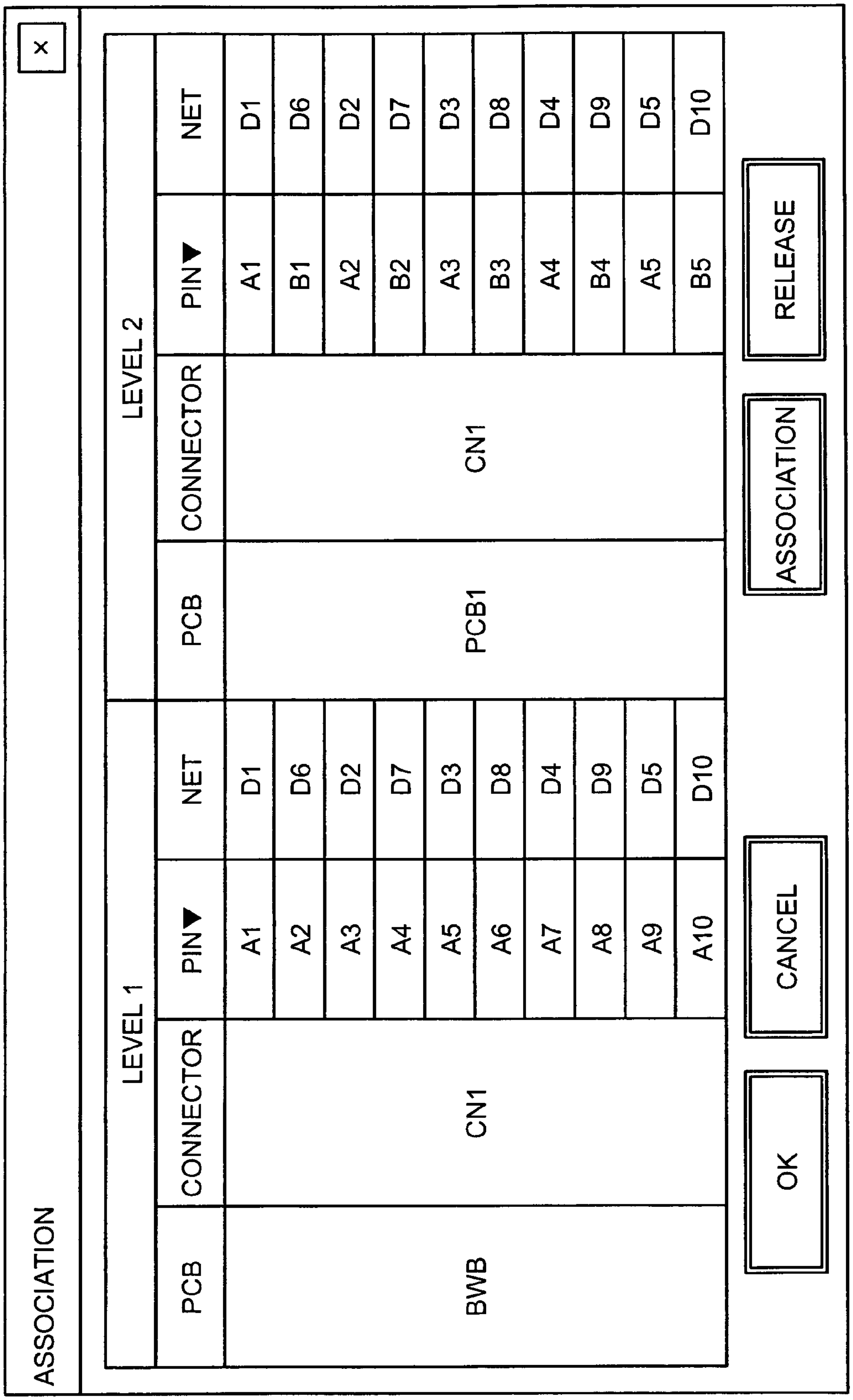

Thus, pin information is sorted on a numeral basis by dividing each pin name into a character portion and a numeral portion, whereby associated pins are displayed on the same row as shown in FIG. 14. In this method, after the character portions of pin names are sorted by ASCII code order, the numeral portions are sorted by a numeric order.

Figure 15:
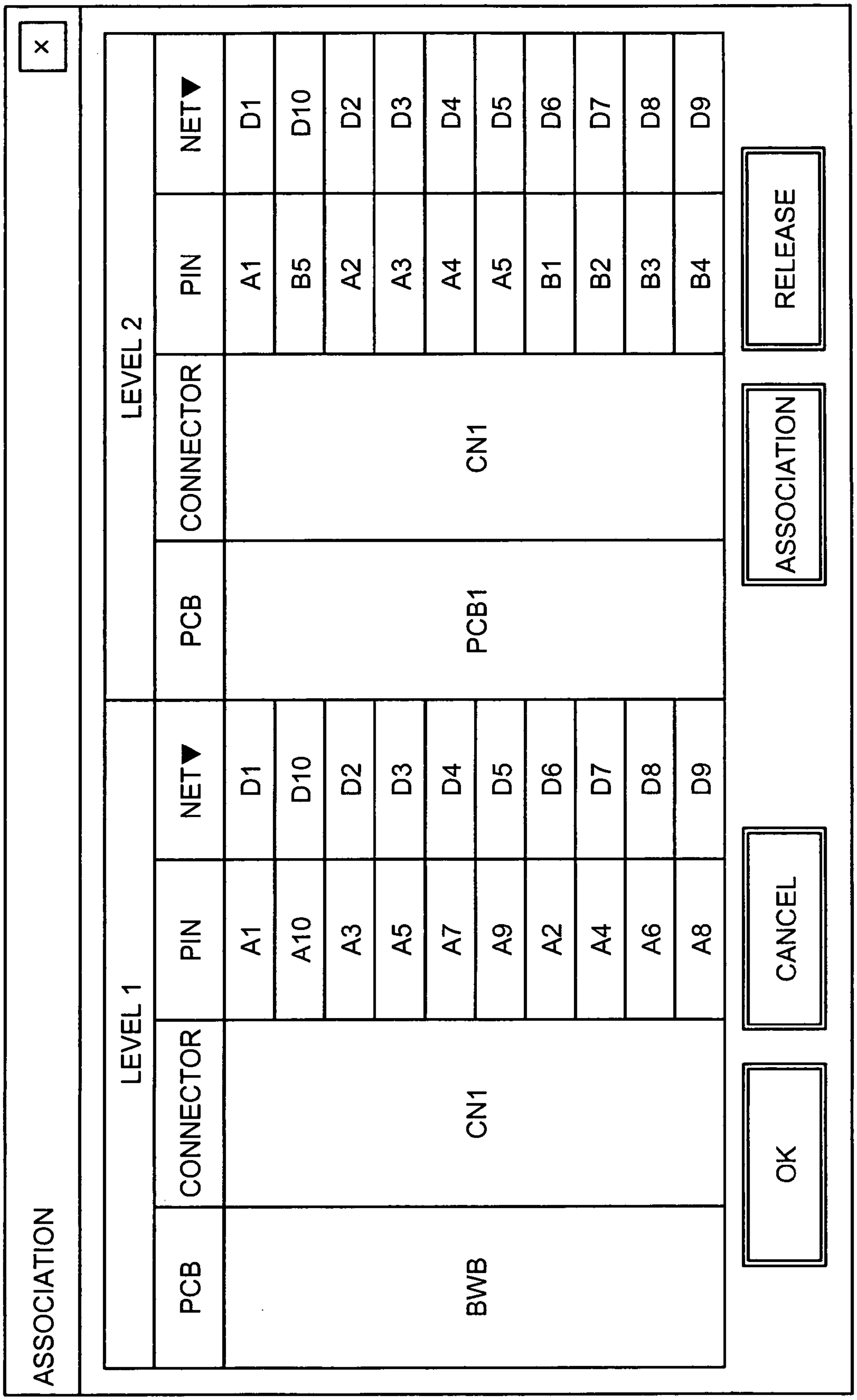
Figure 16:
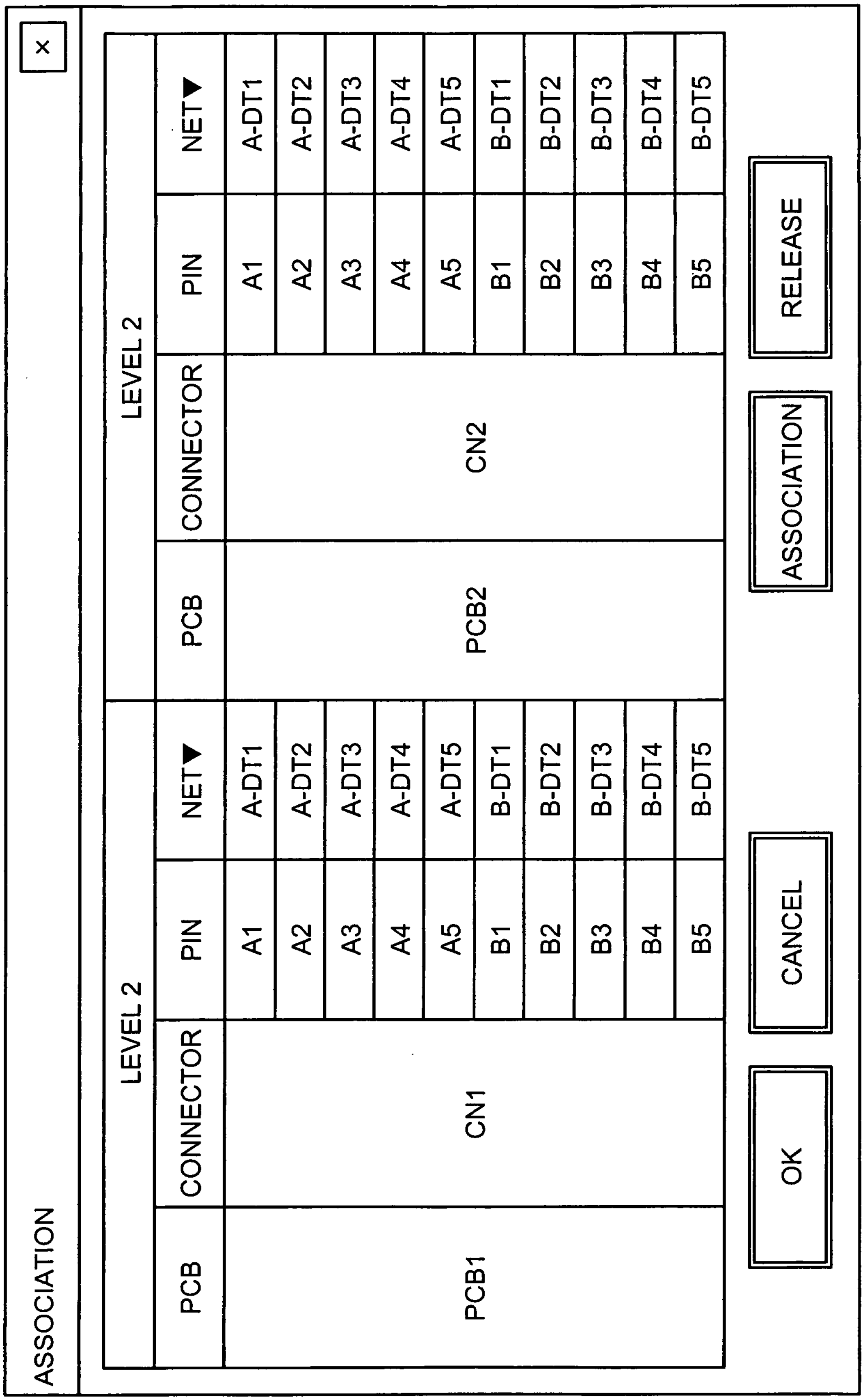

The association screen is configured such that the pin-information sorting unit 343 sorts pin information based on net names when the header or the title box of "Net" column is selected as shown in FIG. 15. In addition, as shown in FIG. 16, logically-transparent net names can be displayed in "Net" column. In such a case, the pin-information sorting unit 343 sorts pin information based on logically-transparent net names when the header or the title box of "Net" column is selected.

As described above, the association screen is configured to sort pin information of connectors in a predetermined manner, and display associated pins on the same row. Therefore, a user can effectively check whether signals are correctly assigned to pins.

The method of sorting pin information can be selected by a user, or automatically selected by the pin-information sorting unit 343 to achieve an optimal result. In this case, the pin-information sorting unit 343 tries all the methods described above, and selects one of them in which the largest number of net names match.

Figure 17:
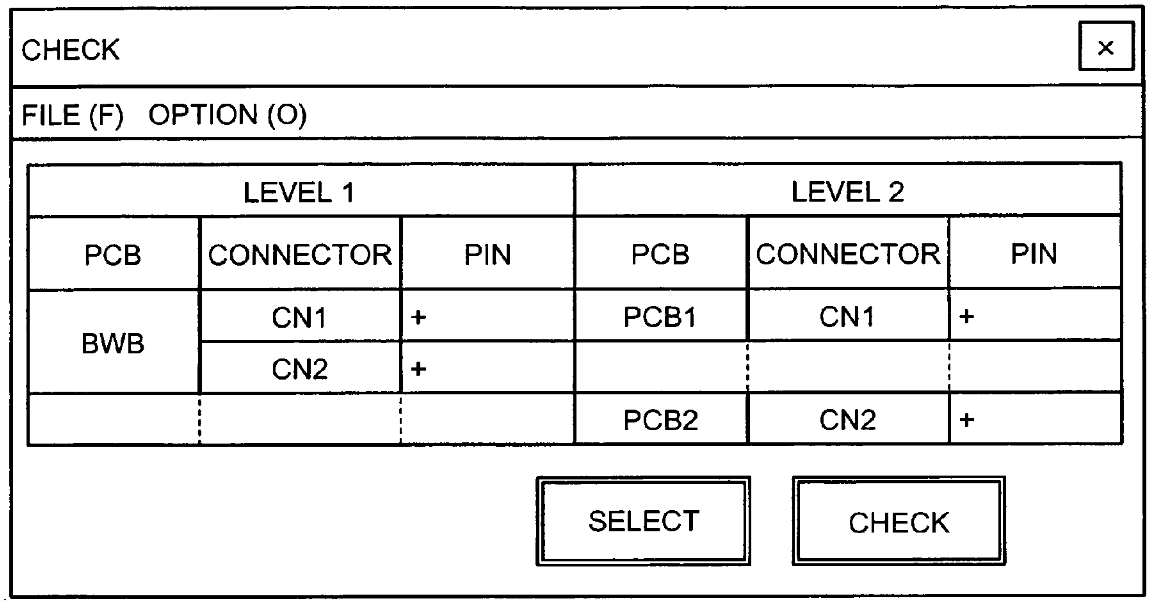
FIG. 17 is an example of the check screen after association is defined.

If it is verified that signals assigned to pins are correct and "OK" key is pressed after the associations of all pins are defined on the association screen, associated connectors are displayed on the same row in the check screen as shown in FIG. 17.

Referring back to FIG. 3, the checking unit 345 checks whether the net names of associated pair of pins defined by the associating unit 344 are correct. The design-data updating unit 346 updates design data and net names set to the pins to the latest version in advance of a check performed by the checking unit 345.

Figure 18:
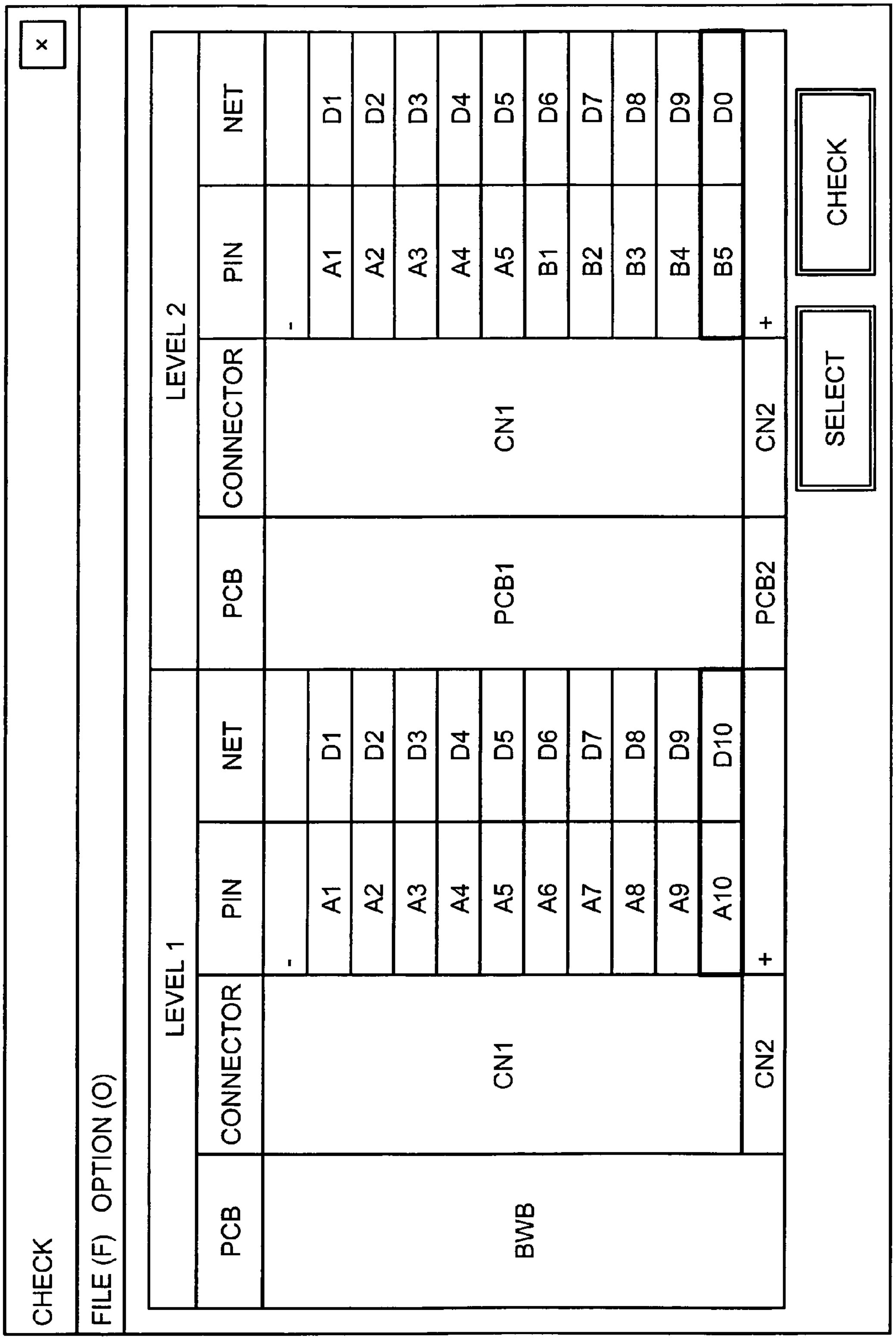
FIG. 18 is an example of the check screen after association is checked.

Specifically, when "Check" key is pressed on the check screen, the checking unit 345 sequentially checks associated pin information. If there is a pair with net names that do not match, the checking unit 345 displays detailed pin information of connectors including the pair as shown in FIG. 18, and specifies the pair by a bold-lined frame, a different color, or the like.

According to a setting previously specified by a user, the checking unit 345 can check associated pin information based on either or both net names and logically-transparent net names of associated pins. If there is a pair with logically-transparent net names that do not match, the checking unit 345 specifies the pair by a bold-lined frame, a different color, or the like.

If a user previously specifies a setting to update design data to the latest version in advance of a check performed by the checking unit 345, the design-data updating unit 346 acquires the latest design data from the design-data server 100 or the CAD apparatuses 401 to 403, and updates net names stored in association with pin names.

Figure 19:
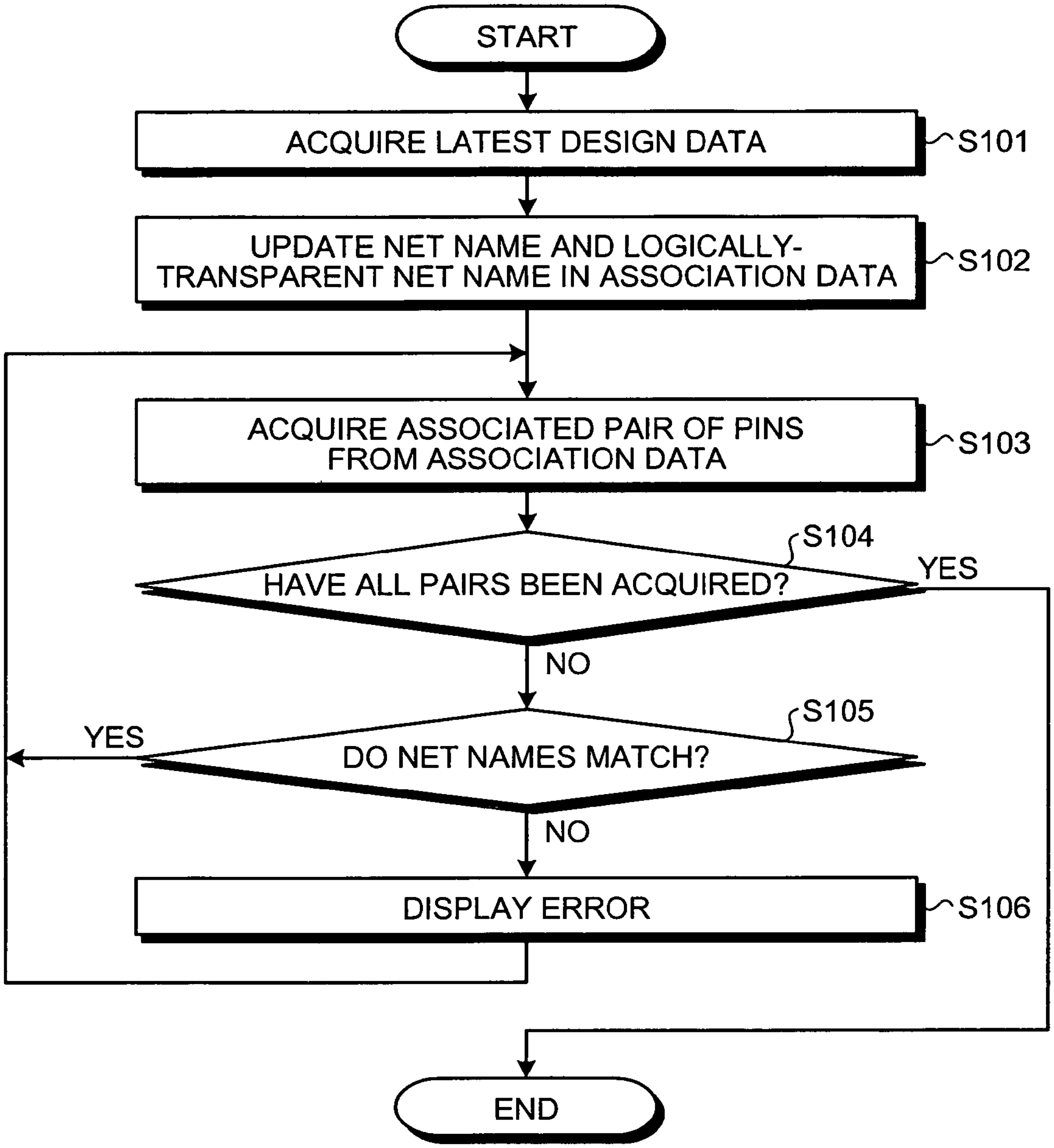
FIG. 19 is a flowchart of a processing procedure of association check.

FIG. 19 is a flowchart of a processing procedure of association check. The processing procedure is performed when a setting has been specified to update design data to the latest version in advance of a check.

If "Check" key is pressed, the design-data updating unit 346 acquires the latest design data (step S101), and updates net names and logically-transparent net names in association data (step S102). The term "association data," as used herein, refers to data that indicates association or correspondence between pins.

Subsequently, the checking unit 345 acquires an associated pair of pins from the association data (step S103). If all pairs of pins have already been acquired from the association data (YES at step S104), the process ends.

On the other hand, if there is a pair of pins yet to be acquired, the pair is acquired from the association data (NO at step S104), and the net names of the pins are compared. If the net names of the pins match (YES at step S105), the process control returns to step S103 to acquire a next pair of pins. If the net names of the pins do not match (NO at step S105), an error indicating a mismatch between the net names is displayed (step S106), and the process control returns to step S103 to acquire a next pair of pins.

In this manner, by checking a match and a mismatch between net names all at once, it is possible to verify that net names are correctly set to a printed circuit board to be connected and to improve a quality of design data. Furthermore, by updating net names to the latest version in advance of a check, it is possible to detect that a net name has been incorrectly updated or to check whether the net name incorrectly updated has been corrected.

Although, in the above explanation, a pair of pins with net names or logically-transparent net names that do not match is highlighted on the check screen, a list of such pairs can be output as an electric file or a document.

If the check support apparatus 301 and the CAD apparatus 401 are integrally configured, a circuit diagram of a portion corresponding to mismatched pins, i.e., pins with net names or logically-transparent net names that do not match, can be displayed to assist a user to check it. A screen for editing the circuit diagram of the portion corresponding to the mismatched pins can also be automatically displayed to assist the user to correct the net names or the logically-transparent net names.

The data input/output unit 347 exchanges the association data, i.e., data indicating the association of pins, with other devices via the network 20. The data input/output unit 347 outputs the association data in an electric file as an association file.

FIG. 20 is an example of the association file. In FIG. 20, a comment row starts with a number sign "#". A block start with "@UNIT" contains information on a drawing and a printed circuit board described in the drawing.

A block start with "@CONNECT" contains information on associated pairs of pins. A block start with "@UNCONNECT" contains information on pins yet to be associated. In the block start with "@CONNECT", information on a pin at a high level specified upon reading of design data is stored as a parent, while information on a pin at a low level is stored as a child.

The association file shown in FIG. 20 stores only associations between the connector CN1 of the printed circuit board BWB and the connector CN1 of the printed circuit board PCB1. However, when an association between the connector CN2 of the printed circuit board BWB and the connector CN2 of the printed circuit board PCB2 is once defined, the association of pins of the connectors CN2 is also stored in the association file. Accordingly, by referring to the association file, it is possible to check associations and connections, via the printed circuit board BWB, between pins of the connector CN1 of the printed circuit board PCB1 and pins of the connector CN2 of the printed circuit board PCB2.

Referring back to FIG. 3, the memory unit 350 stores therein various types of information, and includes the design-data memory 351 and the association memory 352. The design-data memory 351 stores therein connector information extracted from data acquired by the design-data acquiring unit 341. The association memory 352 stores therein information on the association of pins defined by the associating unit 344.

FIG. 21 is an example of the structure of design data. As shown in FIG. 21, design data stored in the design-data memory 351 contains design information 351*a* that indicates a drawing and a printed circuit board including a connector, connector information 351*b* that contains library access key and the like for acquiring a part name of the connector or information on the connector from the part-information server 200, and pin information 351*c* that contains information on pins included in the connector.

FIG. 22 is an example of the structure of association data. As shown in FIG. 22, association data stored in the association memory 352 contains connector association information 352*a* that indicates an association between connectors, and pin association information 352*b* that indicates an association between pins.

The CAD apparatuses 401 to 403 shown in FIG. 2 are explained below. The CAD apparatuses 401 to 403 are of like configuration and function in the same manner, and thus but one of them, the CAD apparatus 401 is explained in detail.

Figure 23:
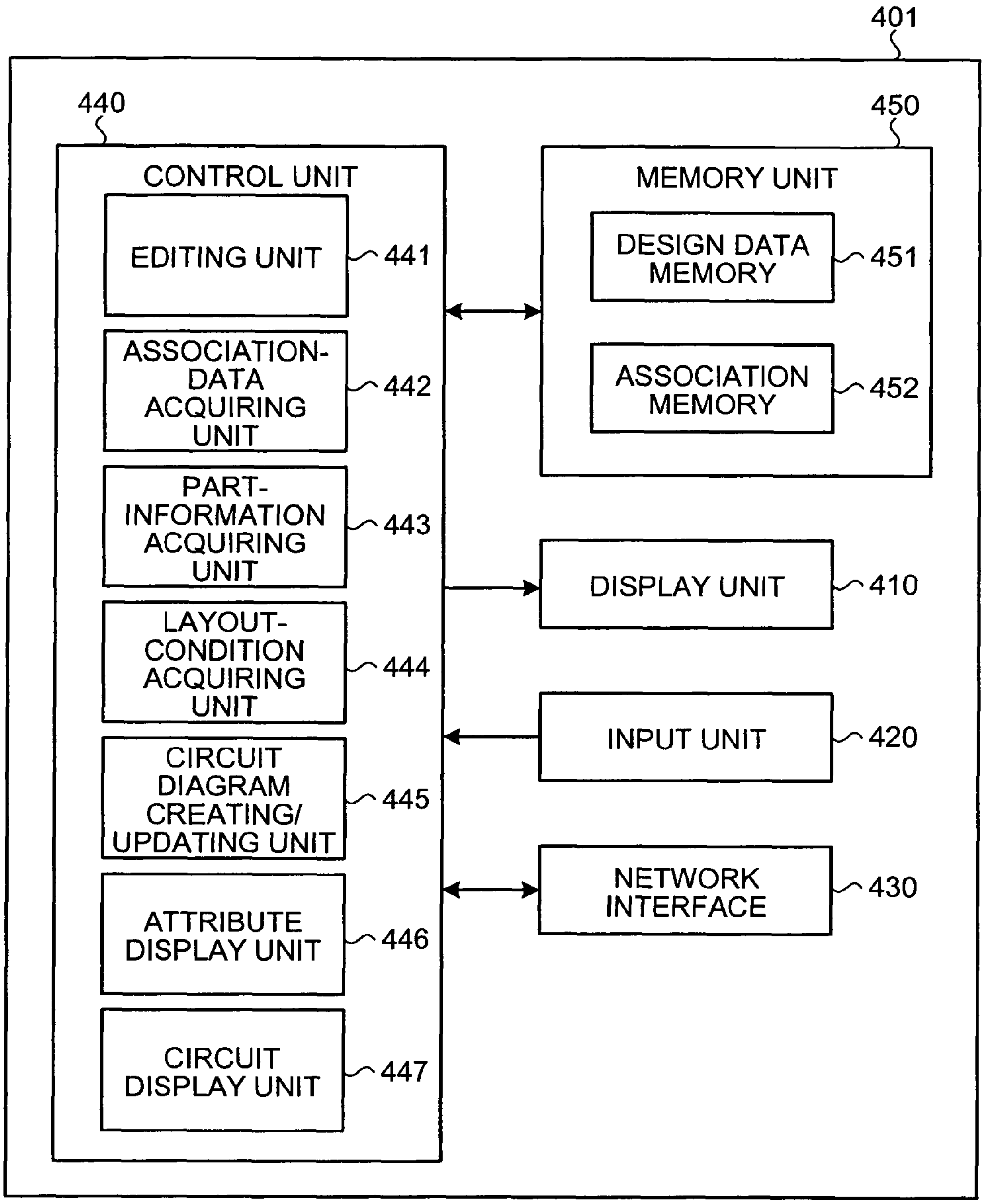
FIG. 23 is a functional block diagram of a CAD apparatus shown in FIG. 2.

FIG. 23 is a functional block diagram of the CAD apparatus 401. The CAD apparatus 401 includes a display unit 410, an input unit 420, a network interface 430, a control unit 440, and a memory unit 450.

The display unit 410 displays various types of information, and includes a liquid crystal display or the like. The input unit 420 is used by a user to provide various types of information, commands or the like. Examples of the input unit 420 include a keyboard, and a mouse. The network interface 430 is an interface for exchanging information with other devices via the network 20.

The control unit 440 controls the CAD apparatus 401. The control unit 440 includes an editing unit 441, an association-data acquiring unit 442, a part-information acquiring unit 443, a layout-condition acquiring unit 444, a circuit diagram creating/updating unit 445, an attribute display unit 446, and a circuit display unit 447.

The editing unit 441 edits a drawing, and is equivalent to that included in a general CAD apparatus. The association-data acquiring unit 442 acquires association data created by the check support apparatuses 301 to 303. The part-information acquiring unit 443 acquires a symbol or the like that indicates a part from the part-information server 200.

The layout-condition acquiring unit 444 acquires a layout condition or rules for creating a circuit diagram of a printed circuit board based on the association data. The circuit diagram creating/updating unit 445 creates and updates the circuit diagram of the printed circuit board based on the association data. The attribute display unit 446 displays attribute information of pins to be associated on an editing screen. The circuit display unit 447 displays an editing screen of the pin to be associated.

With the association-data acquiring unit 442, the part-information acquiring unit 443, the layout-condition acquiring unit 444, and the circuit diagram creating/updating unit 445, a circuit diagram of a printed circuit board can be created or updated based on association data.

Figure 24:
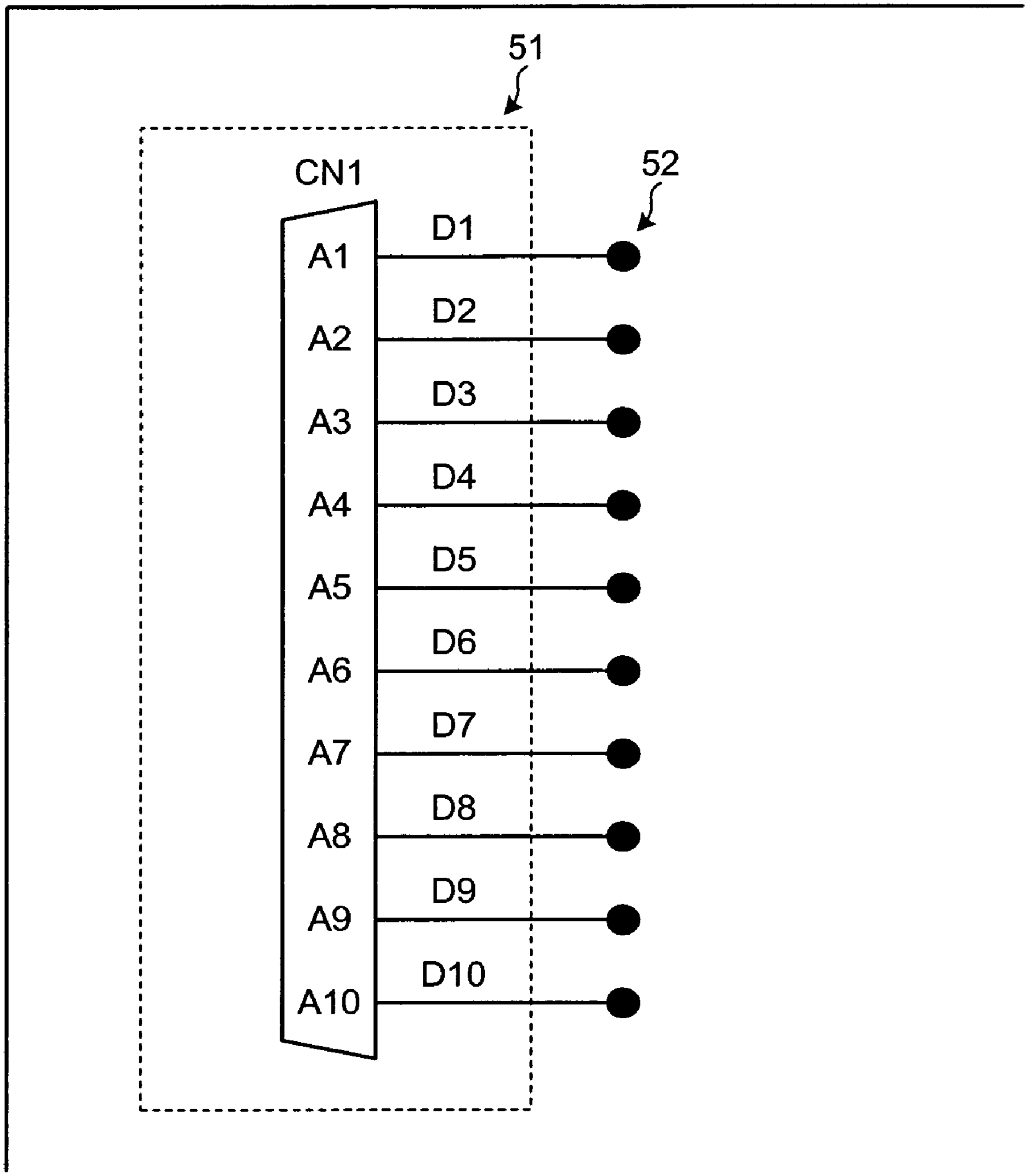
FIG. 24 is an example of a circuit diagram to be created.

An example of a circuit diagram created based on association data is shown in FIG. 24. In the circuit diagram shown in FIG. 24 is arranged a symbol 51 corresponding to a connector including pins whose association is defined. Part names are added to the pins, and signal lines with net names are extended from the pins, respectively. At the end of each signal line is a signal connector 52.

When it is required to create or update a circuit diagram of a printed circuit board based on association data, the layout-condition acquiring unit 444 displays a circuit-diagram creation/update screen on the display unit 410 through which a user can input necessary information.

FIG. 25 is an example of the circuit-diagram creation/update screen. As shown in FIG. 25, the circuit-diagram creation/update screen contains an area for specifying an association file, an area for specifying a shape and a position of a target part, an area for specifying an order of outputting parts, and an area for specifying a layout condition of the parts. Based on the layout condition, symbols of the parts (connectors) are laid out on a circuit diagram.

Figure 26:
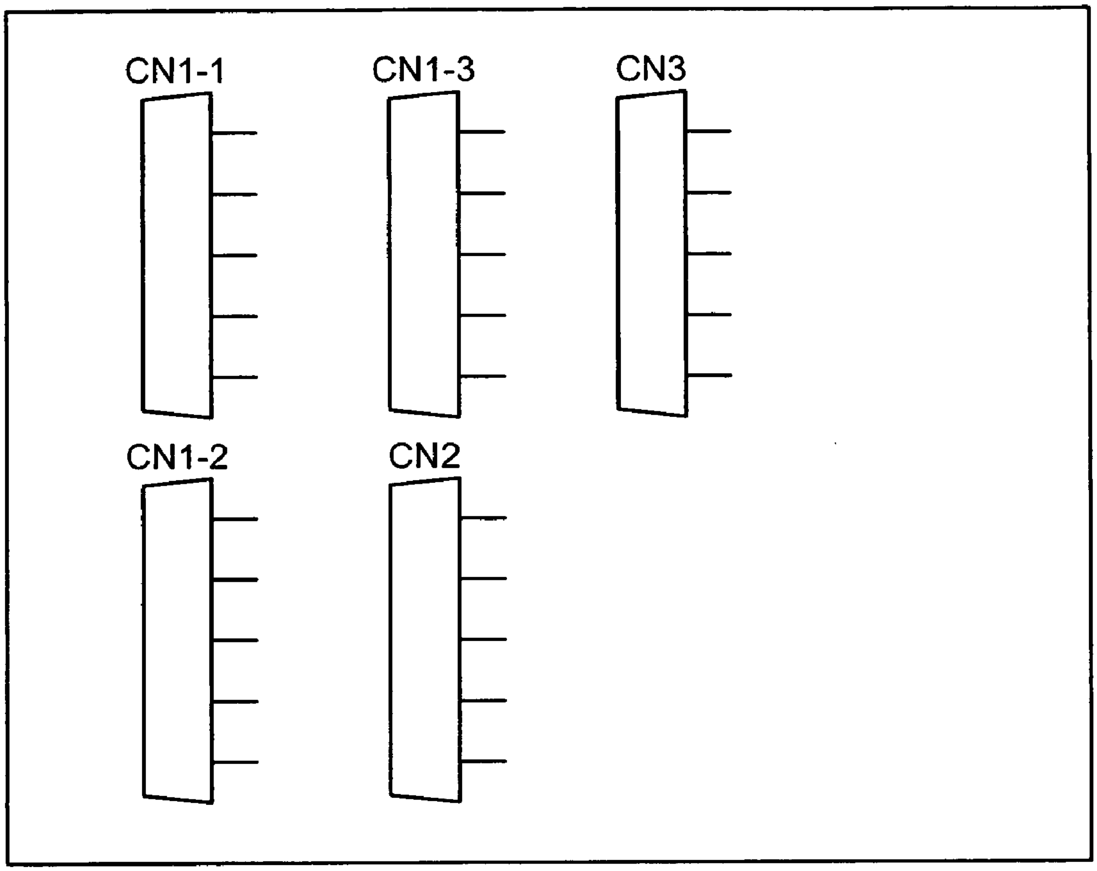
FIG. 26 is an example of layout of parts when the parts are sequentially arranged.

If "Arrange sequentially" is specified as the layout condition of parts, symbols of connectors are sequentially arranged as shown in FIG. 26. On the other hand, if "Align identical parts" is specified as the layout condition, symbols corresponding to an identical connector are aligned in the same line.

Figure 27:
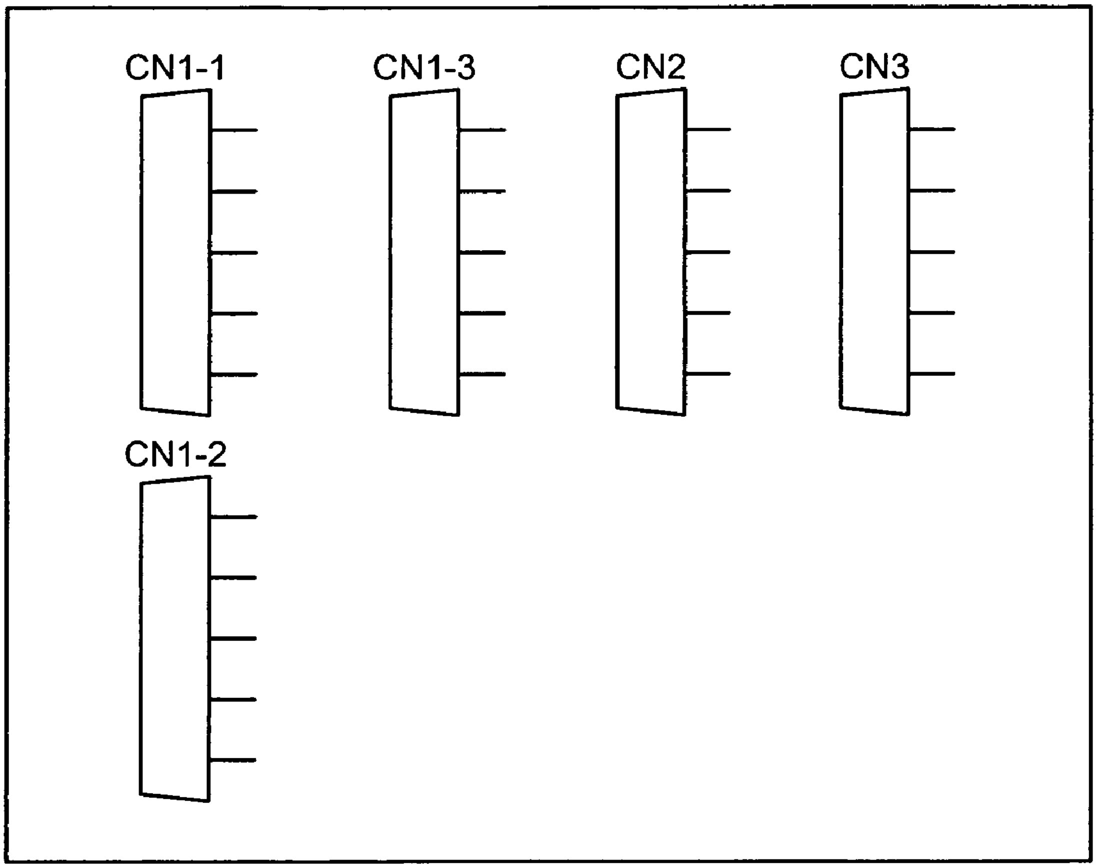
FIG. 27 is an example of layout of parts when identical parts are aligned in a line.

When a connector includes a number of pins, the connector may be divided into a plurality of portions such that the portions can be indicated by different symbols. All the symbols of the connector are registered in the part-information server 200. For example, three symbols CN1-1 to CN1-3 shown in FIGS. 26 and 27 correspond to one connector. If a circuit diagram contains a plurality of symbols for a single connector, it is often difficult to discriminate which symbol corresponds to which connector. However, by arranging symbols corresponding to an identical connector in the same line, the symbols can easily be discriminated.

Figure 28:
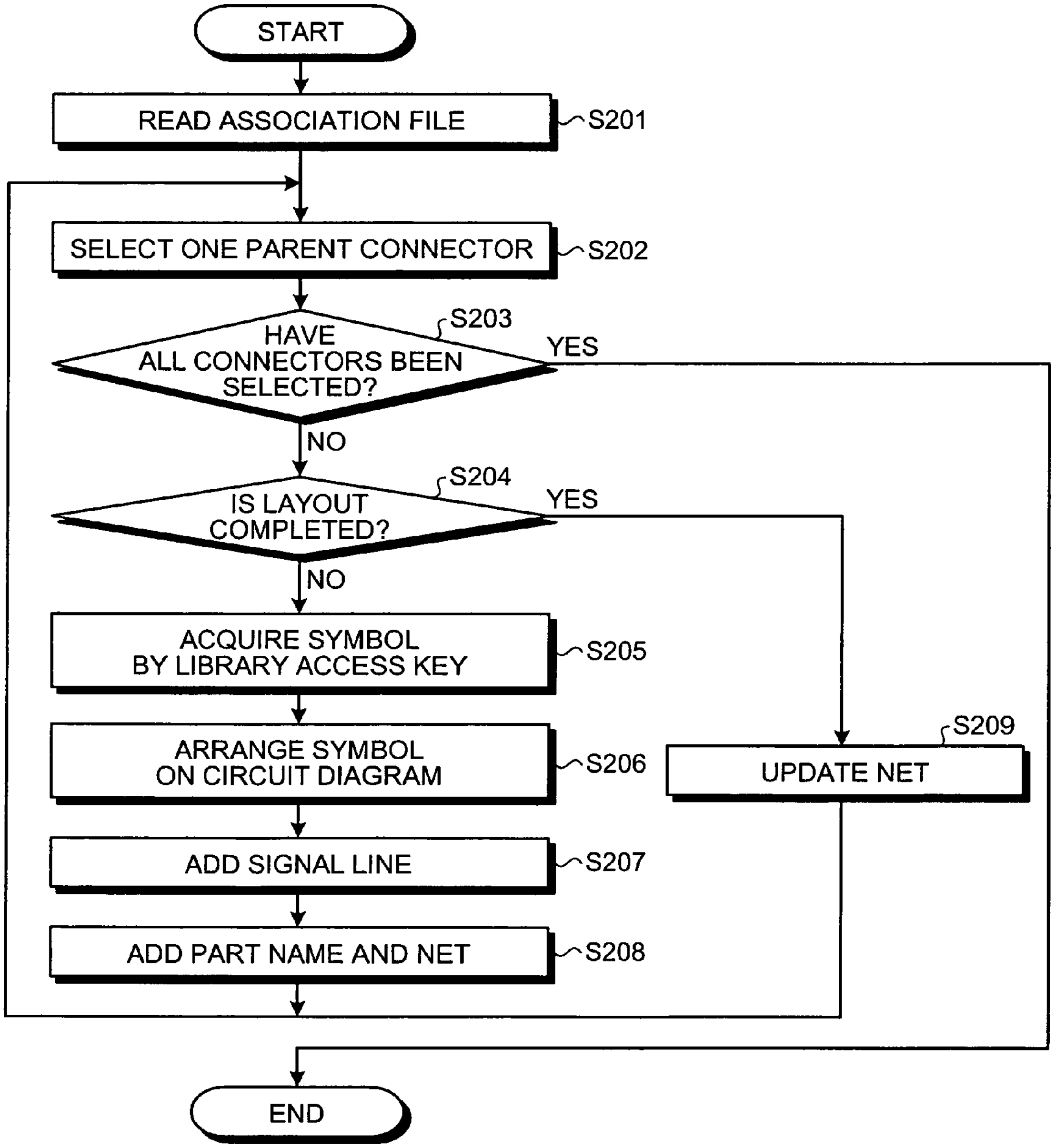
FIG. 28 is a flowchart of a processing procedure of a circuit diagram creation/update.

A processing procedure performed after required information is input on the circuit-diagram creation/update screen is shown in FIG. 28. The association-data acquiring unit 442 acquires and reads an association file specified on the circuit-diagram creation/update screen (step S201). The circuit diagram creating/updating unit 445 selects a parent connector from the association file (step S202).

If all parent connectors have already been selected (YES at step S203), the circuit diagram creating/updating unit 445 ends the process. If there is a parent connector yet to be selected (NO at step S203), the parent connector is selected. When the parent connector is not arranged on the circuit diagram (NO at step S204), the circuit diagram creating/updating unit 445 instructs the part-information acquiring unit 443 to acquire the symbol from the part-information server 200 using a library access key (step S205).

The symbol acquired is arranged on a predetermined position on the circuit diagram according to a specified condition (step S206). After adding a signal line to the symbol (step S207), the part name and the net name are added to the symbol and the signal line, respectively (step S208). On the other hand, if the selected parent connector has already been arranged on the circuit diagram (YES at step S204), the net name is updated so that the net names on the circuit diagram correspond to those in the association file (step S209).

After the above process for a selected connector, the circuit diagram creating/updating unit 445 selects a next connector (step S202). Although creation of a circuit diagram is explained with parent connectors in an association file, a circuit diagram can be created for child connectors in a similar manner.

Referring back to FIG. 23, if a pin of a connector is selected while design data is being edited and a predetermined operation is performed, the attribute display unit 446 displays information on a corresponding pin (destination pin) of a printed circuit board (destination printed circuit board) to be connected to the pin on the display unit 410. The circuit display unit 447 displays design data of a portion corresponding the destination pin of the destination printed circuit board on the display unit 410.

Figure 29:
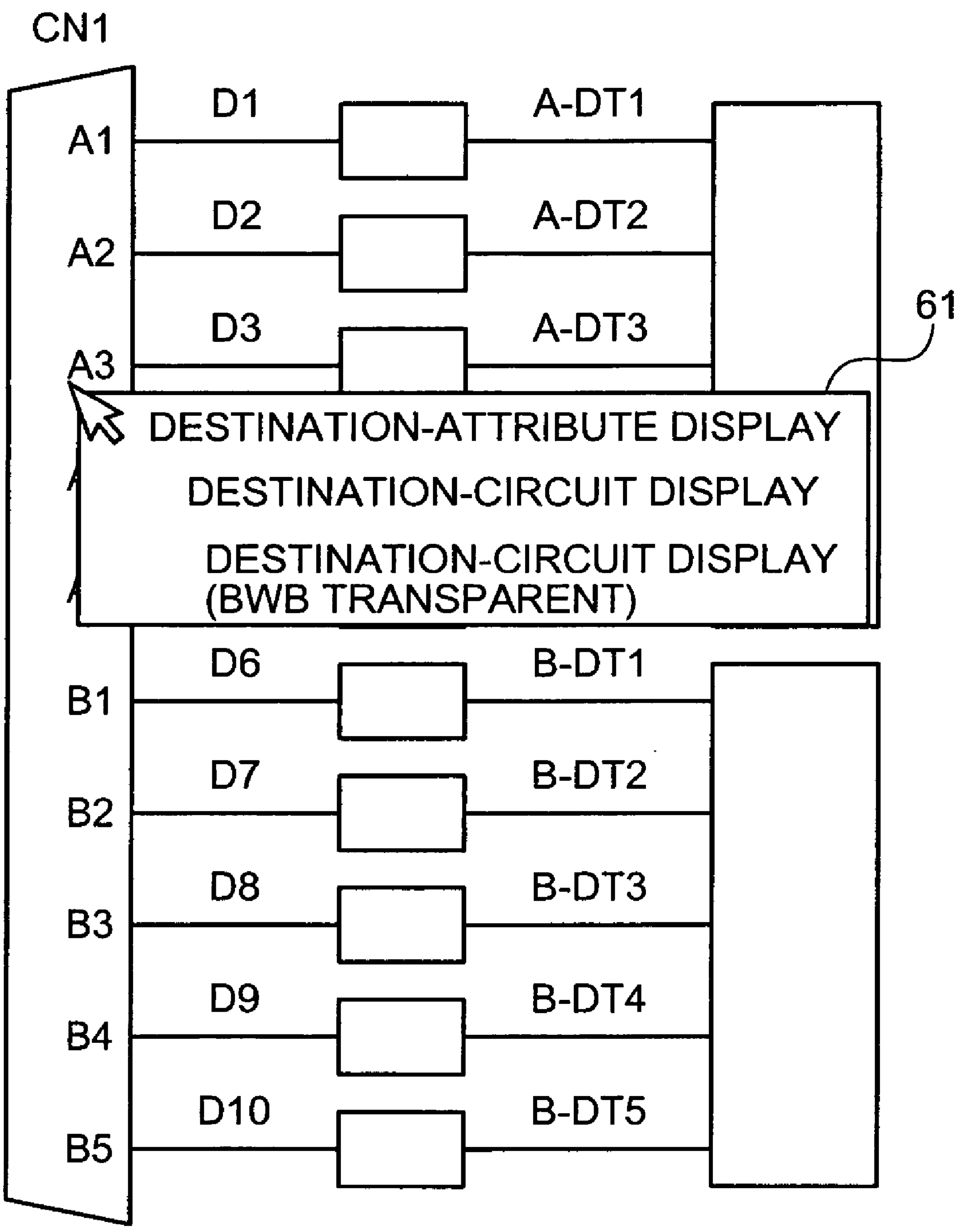
FIG. 29 is an example of a process selection menu.

For example, if a mouse is right-clicked in such a state that a pin A3 is selected while design data of the printed circuit board 12 is being edited, the CAD apparatus 401 displays a process selection menu 61 as shown in FIG. 29.

Figure 30:
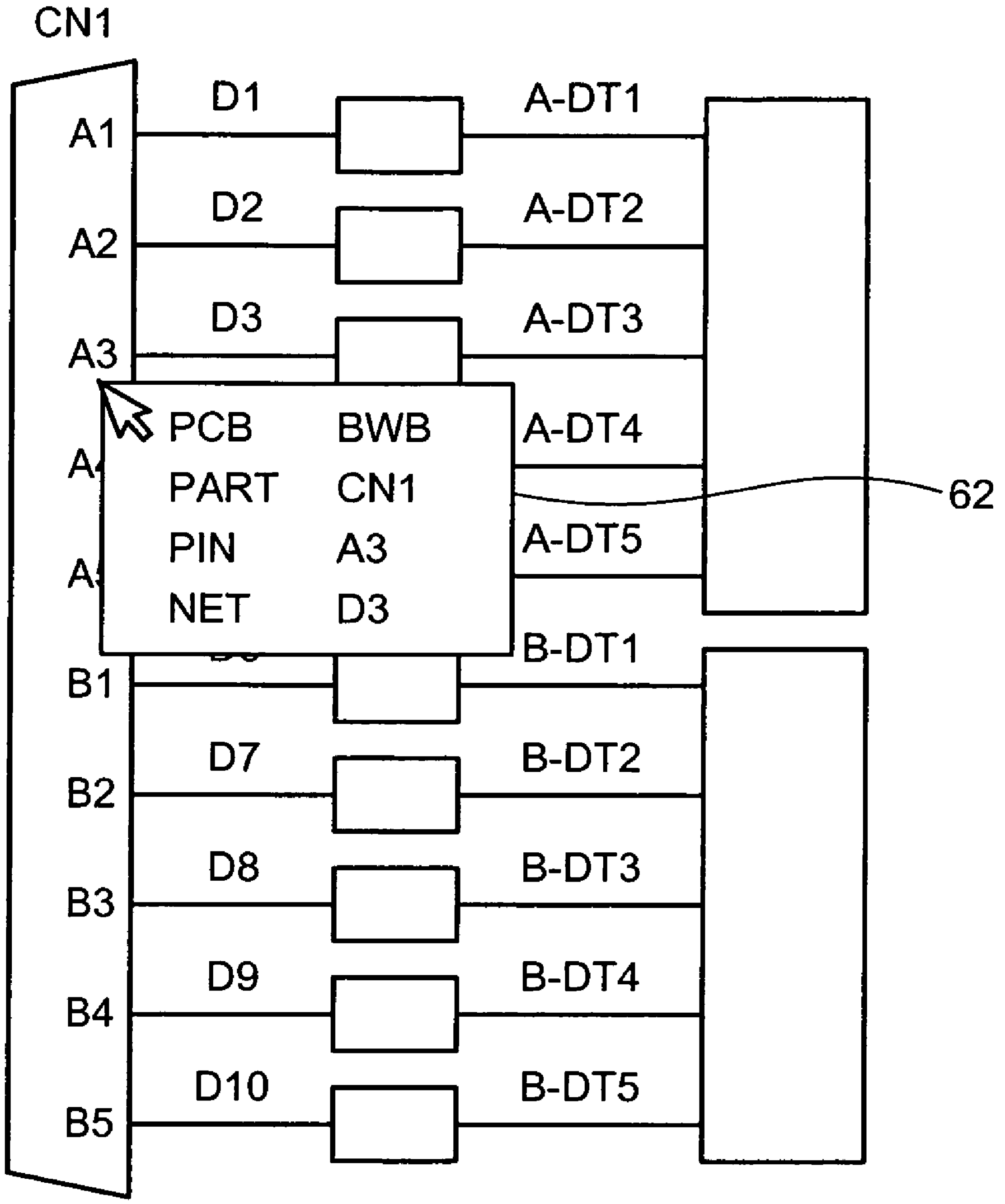
FIG. 30 is an example of a display of destination-attribute information.

If "Destination-attribute display" is selected in the process selection menu 61, the attribute display unit 446 displays a popup window 62 showing information on the pin A3 of the connector CN1 of the printed circuit board 11 as shown in FIG. 30. The information shown in the popup window 62 includes at least the pin name and the net name of the pin A3. Preferably, the pin name and the net name are acquired from the design data including the printed circuit board 11.

In this manner, with a display of information on destination pins of a destination printed circuit boards, a user can carry out editing work while checking whether signals are correctly assigned to the pins.

If "Destination-circuit display" is selected in the process selection menu 61, the circuit display unit 447 opens an editing screen of the circuit diagram of the printed circuit board 11 to be connected, and zooms in a portion corresponding to the pin A3 of the connector CN1 on the display.

If "Destination-circuit display (BWB transparent)" is selected in the process selection menu 61, the circuit display unit 447 opens an editing screen of the circuit diagram of the printed circuit board 13 to be connected via the printed circuit board 11 that is a BWB, and zooms in a portion corresponding to the pin A3 of the connector CN2 on the display.

In this manner, by displaying an editing screen of a portion corresponding to a destination pin of a destination printed circuit board or a destination printed circuit board to be connected via a BWB, a user can easily change an assignment of a signal to the pin.

Figure 31:
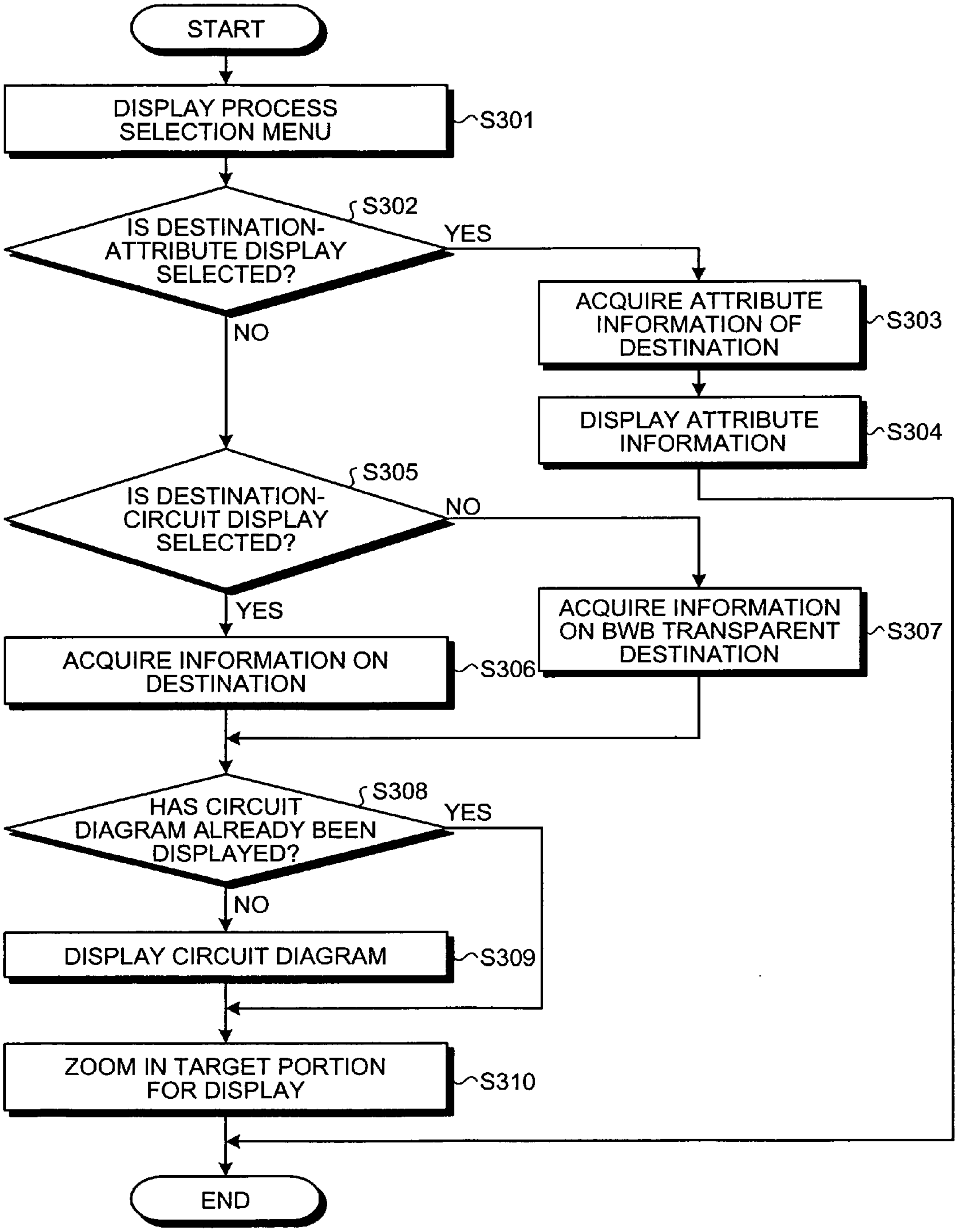
FIG. 31 is a flowchart of a processing procedure performed on the process selection menu.

FIG. 31 is a flowchart of a processing procedure performed on the process selection menu 61. As shown in FIG. 31, after the process selection menu 61 is displayed (step S301), if "Destination-attribute display" is selected (YES at step S302), the attribute display unit 446 acquires information on a destination pin of a destination printed circuit board (step S303), and displays the information (step S304).

If "Destination-circuit display" is selected in the process selection menu 61 (NO at step S302, YES at step S305), the circuit display unit 447 acquires information on a destination printed circuit board (step S306). If "Destination-circuit display (BWB transparent)" is selected (NO at step S302, NO at step S305), the circuit display unit 447 acquires information on a destination printed circuit board to be connected via a BWB (step S307).

In this manner, after acquiring the information on the printed circuit board, when the editing screen of the circuit diagram of the printed circuit board is not displayed (NO at step S308), the circuit display unit 447 displays the editing screen of the circuit diagram (step S309). Thereafter, on the editing screen displayed, the circuit display unit 447 zooms in a portion corresponding to the destination pin associated with a pin selected (step S310).

Attribute information of a destination printed circuit board is required to be read in advance by the association-data acquiring unit 442 and stored in an association memory 452 of the memory unit 450 such that the attribute display unit 446 and the circuit display unit 447 can realize the above functions. The association-data acquiring unit 442 can automatically read the attribute information upon start of editing work, or read the attribute information in response to an instruction from a user.

Referring back to FIG. 23, the memory unit 450 stores therein various types of information, and includes a design-data memory 451 and the association memory 452. The design-data memory 451 stores therein design data of a printed circuit board to be edited. The association memory 452 stores therein information indicating the association of pins defined by the check support apparatuses 301 to 303.

As described above, the check support apparatuses 301 to 303 and the CAD apparatuses 401 to 403 according to the embodiment include various functions for effectively designing a printed circuit board to be connected to another printed circuit board.

The check support apparatus and the CAD apparatus are explained above as hardware; however, they can be implemented as software. For example, a computer program that realizes the same function as the control unit 340 of the check support apparatus 301 can be executed on a computer to implement the check support apparatus 301. Similarly, a computer program that realizes the same function as the control unit 440 of the CAD apparatus 401 can be executed on a computer to implement the CAD apparatus 401.

The check support apparatus and the CAD apparatus can also be implemented as single software. Specifically, a computer program that realizes the same functions as both the control unit 340 and the control unit 440 can be executed on a computer to implement both the check support apparatus 301 and the CAD apparatus 401.

Such a computer is explained that executes a computer program (hereinafter, "check support program") to implement the functions of the control unit 340. A computer program that implements the functions of the control unit 440 is executed by a computer having a similar configuration.

Figure 32:
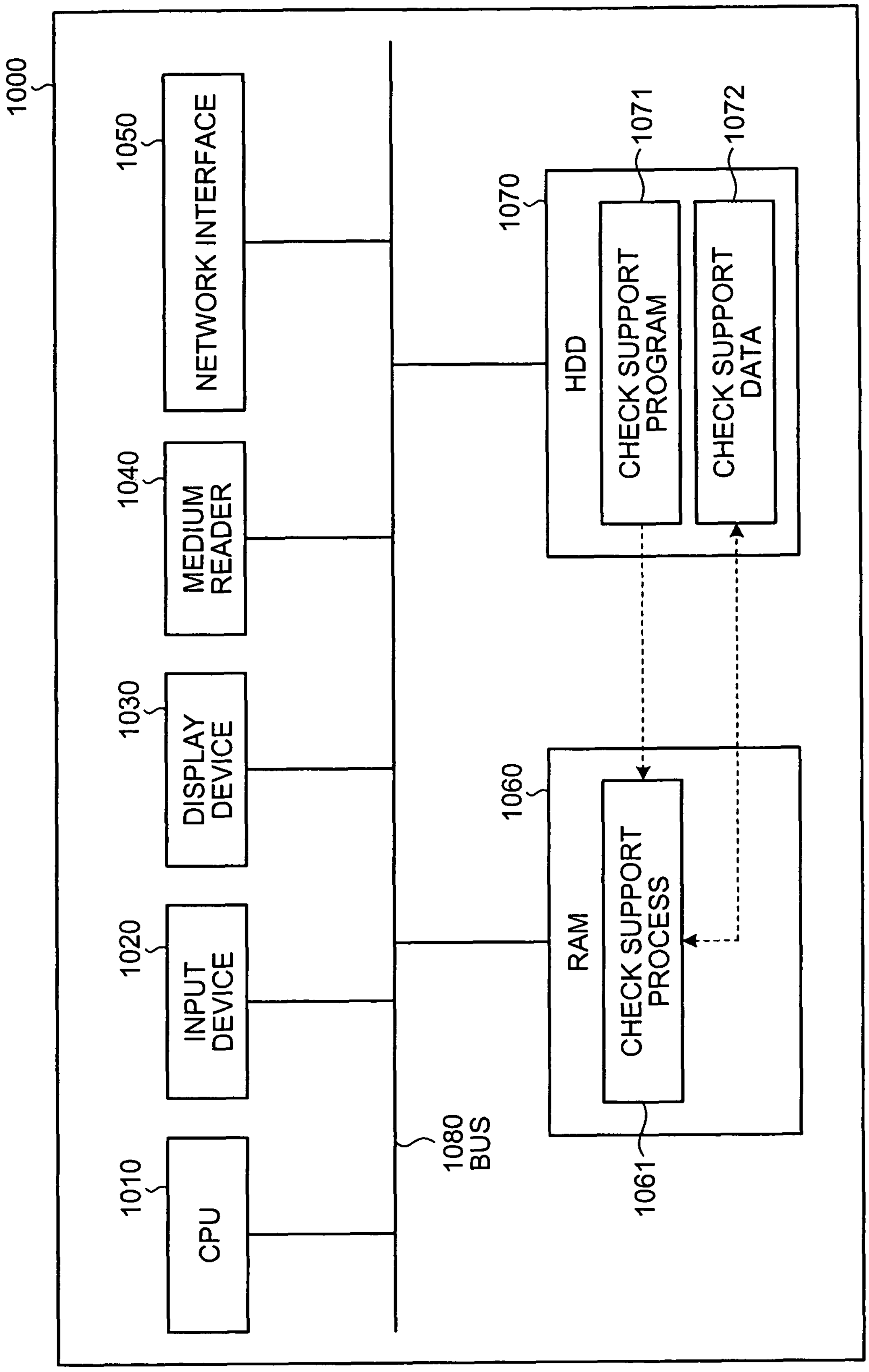
FIG. 32 is a functional block diagram of a computer that executes a check support program.

FIG. 32 is a functional block diagram of a computer 1000 that executes a check support program 1071. The computer 1000 includes a central processing unit (CPU) 1010, an input device 1020, a display device 1030, a medium reader 1040, a network interface 1050, a random access memory (RAM) 1060, and a hard disk drive (HDD) 1070, which are connected one another via a bus 1080.

The CPU 1010 executes various operation processes. The input device 1020 receives input of data from a user. The display device 1030 displays various types of information thereon. The medium reader 1040 reads a program and the like from a recording medium. The network interface 1050 exchanges data with another computer via a network. The RAM 1060 temporarily stores therein various types of information.

The HDD 1070 stores therein the check support program 1071 having the same function as the control unit 340, and check support data 1072 corresponding to various data stored in the memory unit 350. The check support data 1072 can be distributed as appropriate and stored in another computer connected via the network.

The CPU 1010 loads the check support program 1071 from the HDD 1070 into the RAM 1060, and executes the check support program 1071 to perform a check support process 1061. In the check support process 1061, the check support data 1072 is loaded as appropriate into an area allocated for the check support process 1061 on the RAM 1060, and various data processes are performed based on the check support data 1072.

The check support program 1071 need not necessarily stored in the HDD 1070. The check support program 1071 can be stored in a recording medium such as a compact disc-read only memory (CD-ROM), and read and executed by the computer 1000. The check support program 1071 can also be stored in another computer (or a server) connected to the computer 1000 via a public line, the Internet, a local area network (LAN), a wide area network (WAN), or the like, and downloaded therefrom to be executed.

As set forth hereinabove, according to an embodiment of the present invention, it is possible to effectively design a printed circuit board to be connected to another printed circuit board via connectors.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer aided design (CAD) apparatus for designing a circuit diagram, comprising:

an association-data acquiring unit that acquires association data that defines an association between a pin of a first connector and a pin of a second connector to be connected to the first connector, and an assignment of a signal to the pins;

a part-information acquiring unit that acquires information including a symbol of the first connector;

a layout-condition acquiring unit that acquires a layout condition to lay out the symbol on a circuit diagram; and a circuit diagram editing unit that lays out, when the symbol has not yet been laid out on the circuit diagram, the symbol on the circuit diagram based on the layout condition, and adds a net name indicating the signal assigned to the pins to the symbol.

2. The CAD apparatus according to claim 1, wherein, when the symbol has already been laid out on the circuit diagram, the circuit diagram editing unit updates an old net name added to the symbol.

3. The CAD apparatus according to claim 1, wherein, when the symbol of the first connector includes a plurality of symbols, the circuit diagram editing unit lays out the symbols such that the symbols are distinguishable from other symbols.

4. A non-transitory computer-readable recording medium that stores therein a computer program for designing a circuit diagram that causes a computer to execute:

acquiring association data that defines an association between a pin of a first connector and a pin of a second connector to be connected to the first connector, and an assignment of a signal to the pins;

acquiring information including a symbol of the first connector;

acquiring a layout condition to lay out the symbol on the circuit diagram; and laying out, when the symbol has not yet been laid out on the circuit diagram, the symbol on the circuit diagram based on the layout condition, and adding a net name indicating the signal assigned to the pins to the symbol.

5. The non-transitory computer-readable recording medium according to claim 4, further comprising updating, when the symbol has already been laid out on the circuit diagram, an old net name added to the symbol.

6. The non-transitory computer-readable recording medium according to claim 4, wherein the laying out includes laying out, when the symbol of the first connector includes a plurality of symbols, the symbols such that the symbols are distinguishable from other symbols.

7. A method of designing a circuit diagram, comprising:

acquiring association data that defines an association between a pin of a first connector and a pin of a second connector to be connected to the first connector, and an assignment of a signal to the pins;

acquiring information including a symbol of the first connector;

acquiring a layout condition to lay out the symbol on the circuit diagram; and laying out, using a processor, when the symbol has not yet been laid out on the circuit diagram, the symbol on the circuit diagram based on the layout condition, and adding a net name indicating the signal assigned to the pins to the symbol.

8. The method according to claim 7, further comprising updating, when the symbol has already been laid out on the circuit diagram, an old net name added to the symbol.

9. The method according to claim 7, wherein the laying out includes laying out, when the symbol of the first connector includes a plurality of symbols, the symbols such that the symbols are distinguishable from other symbols.

* * * * *